(12) United States Patent
Watanabe

(10) Patent No.: US 11,862,025 B2
(45) Date of Patent: Jan. 2, 2024

(54) METHOD FOR CALCULATING DANGEROUS SPOT AND TIME, STORAGE MEDIUM, AND DEVICE FOR CALCULATING DANGEROUS SPOT

(71) Applicant: FUJITSU LIMITED, Kawasaki (JP)

(72) Inventor: Isamu Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 126 days.

(21) Appl. No.: 17/392,349

(22) Filed: Aug. 3, 2021

(65) Prior Publication Data

US 2021/0366291 A1    Nov. 25, 2021

Related U.S. Application Data

(63) Continuation of application No. PCT/JP2019/005680, filed on Feb. 15, 2019.

(51) Int. Cl.
  *G08G 3/02* (2006.01)
  *B63B 79/40* (2020.01)
  (Continued)

(52) U.S. Cl.
  CPC .......... *G08G 3/02* (2013.01); *B60G 2800/242* (2013.01); *B60W 30/08* (2013.01); *B63B 49/00* (2013.01); *B63B 79/40* (2020.01)

(58) Field of Classification Search
  CPC .. G08G 3/02; G08G 3/00; G08G 1/16; H04W 4/023; H04W 4/90; H04W 4/42;
  (Continued)

(56) References Cited

U.S. PATENT DOCUMENTS 9,418,558 B1 *   8/2016  Stamenkovich ......... G08G 3/02
11,195,419 B2 * 12/2021  Suzuki .................... B63B 49/00
(Continued)

FOREIGN PATENT DOCUMENTS

CN    110869703 A  *  3/2020  .......... B60W 30/095
HK    2009-037445 A     2/2009
(Continued)

OTHER PUBLICATIONS

L. Chen, Y. Fu, P. Chen and J. Mou, "Survey on Cooperative Collision Avoidance Research for Ships," in IEEE Transactions on Transportation Electrification, 2022, doi: 10.1109/TTE.2022.3221643 (Year: 2022).*
(Continued)

*Primary Examiner* — Cuong H Nguyen
(74) *Attorney, Agent, or Firm* — Fujitsu Intellectual Property Center

(57) ABSTRACT

A method for calculating a dangerous spot and time for a computer to execute a process includes, detecting, by at least two mobile bodies, an avoidance action, which is an action that indicates a possibility that each mobile body has avoided a collision with another mobile body, based on locus data of a plurality of mobile bodies that belongs to a predetermined area; calculating an evaluation value that indicates a possibility that an avoidance action by one of the two mobile bodies has occurred under an influence of an avoidance action by another one; and calculating, based on the evaluation value, a collision risk in an area where a plurality of mobile bodies is concentrated.

6 Claims, 17 Drawing Sheets

(51) Int. Cl.
*B63B 49/00* (2006.01)
*B60W 30/08* (2012.01)

(58) Field of Classification Search
CPC ........ B63B 79/40; B63B 49/00; G05D 1/026; G06N 3/08
USPC .......................................................... 701/301
See application file for complete search history.

(56) References Cited

U.S. PATENT DOCUMENTS

| | | | |
|---|---|---|---|
| 2016/0299507 A1* | 10/2016 | Shah | .................... G01C 21/203 |
| 2017/0032402 A1* | 2/2017 | Patsiokas | ........... G06Q 30/0207 |
| 2017/0284808 A1* | 10/2017 | Saito | ........................ B63B 49/00 |
| 2017/0284809 A1 | 10/2017 | Tanaka | |
| 2017/0309190 A1 | 10/2017 | Suzuki et al. | |
| 2020/0035105 A1* | 1/2020 | Suzuki | ..................... G08G 3/02 |

FOREIGN PATENT DOCUMENTS

| | | | | |
|---|---|---|---|---|
| JP | H09-22500 A | 1/1997 | | |
| JP | H11-272999 A | 10/1999 | | |
| JP | 2017-182711 A | 10/2017 | | |
| JP | 2017-182729 | 10/2017 | | |
| JP | 2017-194902 A | 10/2017 | | |
| JP | WO2020166080 A1 * | 8/2020 | .............. | G08G 3/02 |
| KR | 20100064287 A * | 6/2010 | .............. | G08G 3/02 |
| WO | 2018/193591 A1 | 10/2018 | | |

OTHER PUBLICATIONS

L. P. Perera, V. Ferrari, F. P. Santos, M. A. Hinostroza and C. Guedes Soares, "Experimental Evaluations on Ship Autonomous Navigation and Collision Avoidance by Intelligent Guidance," in IEEE Journal of Oceanic Engineering, vol. 40, No. 2, pp. 374-387, Apr. 2015, doi: 10.1109/JOE.2014.2304793 (Year: 2015).*

T. A. Johansen et al., "Ship Collision Avoidance and COLREGS Compliance Using Simulation-Based Control Behavior Selection With Predictive Hazard Assessment," in IEEE Transactions on Intelligent Transportation Systems, vol. 17, No. 12, pp. 3407-3422, Dec. 2016, doi: 10.1109/TITS.2016.2551780 (Year: 2016).*

L. P. Perera, J. P. Carvalho and C. Guedes Soares, "Solutions to the Failures and Limitations of Mamdani Fuzzy Inference in Ship Navigation," in IEEE Transactions on Vehicular Technology, vol. 63, No. 4, pp. 1539-1554, May 2014, doi: 10.1109/TVT.2013.2288306 (Year: 2014).*

"Collision risk analysis on ferry ships in Jiangsu Section of the Yangtze River based on AIS data" by Mingyou Cai et al, Reliability Engineering & System Safety, vol. 215, Nov. 2021, 107901 (Year: 2021).*

"Accident susceptibility index for a passenger ship—a framework and case study"; Author links open overlay panelJakub Montewka et al; Reliability Engineering & System Safety; vol. 218, Part A, Feb. 2022, 108145 (Year:2022).*

"A Quantative Evaluation Method for Obstacle Avoidance Performance" by Guaquan Xiao et al; Journal of Marine Science and Engineering, (Year:2021).*

Yu, H., Meng, Q., Fang, Z., Liu, J., & Xu, L. (2022). A review of ship collision risk assessment, hotspot detection and path planning for maritime traffic control in restricted waters. The Journal of Navigation, 75(6), 1337-1363. (Year: 2022).*

JPOA—Office Action of Japanese Patent Application No. 2020-572054 dated Jul. 5, 2022 with Full Machine Translation. ** Reference JP2017-182711 cited in the JPOA was previously submitted in the Ids filed on Aug. 3, 2021.

International Search Report and Written Opinion of the International Searching Authority (Form PCT/ISA/210, 220, and 237), mailed in connection with PCT/JP2019/005680 and dated May 21, 2019 (Total 11 pages).

EESR—Extended European Search Report of European Patent Application No. 19915464.2 dated Jan. 26, 2022.

EPOA—Office Action of European Patent Application No. 19915464.2 dated Jun. 23, 2023.

* cited by examiner

| DATE AND TIME | VESSEL ID | LONGITUDE | LATITUDE | SPEED | COURSE |
|---|---|---|---|---|---|
| 7/9/2015 14:00:00 | A | 139.7303 | 35.3023 | 10.2 | 144.7 |
| 7/9/2015 14:00:18 | A | 139.7306 | 35.3019 | 10.2 | 144.6 |
| 7/9/2015 14:00:19 | A | 139.7306 | 35.3019 | 10.2 | 144.6 |
| 7/9/2015 14:00:27 | A | 139.7309 | 35.3015 | 10.2 | 144.5 |
| ... | ... | ... | ... | ... | ... |

| DATE AND TIME | VESSEL ID | LONGITUDE | LATITUDE | SPEED | COURSE |
|---|---|---|---|---|---|
| 7/9/2015 14:00:00 | A | 139.7300 | 35.3026 | 10.2 | 144.9 |
| 7/9/2015 14:00:10 | A | 139.7303 | 35.3022 | 10.2 | 144.7 |
| 7/9/2015 14:00:20 | A | 139.7306 | 35.3018 | 10.2 | 144.6 |
| ... | ... | ... | ... | ... | ... |

| DATE AND TIME | VESSEL ID #1 | VESSEL ID #2 | BASE RISK VALUE |
|---|---|---|---|
| 7/9/2015 14:00:00 | A | B | 0.1 |
| 7/9/2015 14:00:00 | A | C | 0 |
| 7/9/2015 14:00:00 | A | D | 0.3 |
| 7/9/2015 14:00:00 | B | C | 0 |
| 7/9/2015 14:00:00 | B | D | 0.2 |
| 7/9/2015 14:00:00 | B | E | 0 |
| 7/9/2015 14:00:00 | C | D | 0 |
| 7/9/2015 14:00:00 | C | E | 0 |
| 7/9/2015 14:00:00 | D | E | 0 |
| 7/9/2015 14:00:10 | A | B | 0.3 |
| 7/9/2015 14:00:10 | A | C | 0 |
| 7/9/2015 14:00:10 | A | D | 0.2 |
| 7/9/2015 14:00:10 | B | C | 0 |
| 7/9/2015 14:00:10 | B | D | 0.5 |
| 7/9/2015 14:00:10 | B | E | 0 |
| 7/9/2015 14:00:10 | C | D | 0.1 |
| 7/9/2015 14:00:10 | C | E | 0 |
| 7/9/2015 14:00:10 | D | E | 0 |
| ... | ... | ... | ... |

| DATE AND TIME | AREA ID | BASE HOT SPOT INDEX |
|---|---|---|
| 7/9/2015 14:00:00 | 1 | 0.1 |
| 7/9/2015 14:00:00 | 2 | 0 |
| 7/9/2015 14:00:00 | 3 | 0.3 |
| 7/9/2015 14:00:00 | 4 | 0 |
| 7/9/2015 14:00:00 | 5 | 0.2 |
| 7/9/2015 14:00:00 | 6 | 0 |
| 7/9/2015 14:00:00 | 7 | 0 |
| 7/9/2015 14:00:00 | 8 | 0 |
| 7/9/2015 14:00:00 | 9 | 0 |
| 7/9/2015 14:00:10 | 1 | 0.3 |
| 7/9/2015 14:00:10 | 2 | 0 |
| 7/9/2015 14:00:10 | 3 | 0.2 |
| 7/9/2015 14:00:10 | 4 | 0 |
| 7/9/2015 14:00:10 | 5 | 0.5 |
| 7/9/2015 14:00:10 | 6 | 0 |
| 7/9/2015 14:00:10 | 7 | 0.1 |
| 2015/7/9 14:00:10 | 8 | 0 |
| 2015/7/9 14:00:10 | 9 | 0 |
| ... | ... | ... |

| DATE AND TIME | VESSEL ID | LONGITUDE | LATITUDE | SPEED | COURSE |
|---|---|---|---|---|---|
| 2015/7/9 14:00:00 | A | 139.7300 | 35.3026 | 10.2 | 144.9 |
| 2015/7/9 14:00:01 | A | 139.7300 | 35.3026 | 10.2 | 144.9 |
| 2015/7/9 14:00:02 | A | 139.7300 | 35.3025 | 10.2 | 144.8 |
| 2015/7/9 14:00:03 | A | 139.7301 | 35.3025 | 10.2 | 144.8 |
| 2015/7/9 14:00:04 | A | 139.7301 | 35.3025 | 10.2 | 144.8 |
| 2015/7/9 14:00:05 | A | 139.7301 | 35.3024 | 10.2 | 144.8 |
| 2015/7/9 14:00:06 | A | 139.7302 | 35.3024 | 10.2 | 144.8 |
| 2015/7/9 14:00:07 | A | 139.7302 | 35.3023 | 10.2 | 144.7 |
| 2015/7/9 14:00:08 | A | 139.7302 | 35.3023 | 10.2 | 144.7 |
| 2015/7/9 14:00:09 | A | 139.7303 | 35.3023 | 10.2 | 144.7 |
| 2015/7/9 14:00:10 | A | 139.7303 | 35.3022 | 10.2 | 144.7 |
| 2015/7/9 14:00:11 | A | 139.7303 | 35.3022 | 10.2 | 144.7 |
| 2015/7/9 14:00:12 | A | 139.7304 | 35.3021 | 10.2 | 144.7 |
| 2015/7/9 14:00:13 | A | 139.7304 | 35.3021 | 10.2 | 144.7 |
| 2015/7/9 14:00:14 | A | 139.73105 | 35.3020 | 10.2 | 144.6 |
| 2015/7/9 14:00:15 | A | 139.73105 | 35.3020 | 10.2 | 144.6 |
| 2015/7/9 14:00:16 | A | 139.73105 | 35.3020 | 10.2 | 144.6 |
| 2015/7/9 14:00:17 | A | 139.73106 | 35.3019 | 10.2 | 144.6 |
| 2015/7/9 14:00:18 | A | 139.73106 | 35.3019 | 10.2 | 144.6 |
| 2015/7/9 14:00:19 | A | 139.73106 | 35.3019 | 10.2 | 144.6 |
| 2015/7/9 14:00:20 | A | 139.73106 | 35.3018 | 10.2 | 144.6 |
| 2015/7/9 14:00:21 | A | 139.73107 | 35.3018 | 10.2 | 144.6 |
| 2015/7/9 14:00:22 | A | 139.73107 | 35.3017 | 10.2 | 144.6 |
| 2015/7/9 14:00:23 | A | 139.73108 | 35.3017 | 10.2 | 144.6 |
| 2015/7/9 14:00:24 | A | 139.73108 | 35.3016 | 10.2 | 144.5 |
| 2015/7/9 14:00:25 | A | 139.73108 | 35.3016 | 10.2 | 144.5 |
| 2015/7/9 14:00:26 | A | 139.73109 | 35.3016 | 10.2 | 144.5 |
| 2015/7/9 14:00:27 | A | 139.73109 | 35.3015 | 10.2 | 144.5 |
| ... | ... | ... | ... | ... | ... |

⇩

142

| DATE AND TIME | VESSEL ID | LONGITUDE | LATITUDE | SPEED | COURSE |
|---|---|---|---|---|---|
| 2015/7/9 14:00:00 | A | 139.7300 | 35.3026 | 10.2 | 144.9 |
| 2015/7/9 14:00:10 | A | 139.7303 | 35.3022 | 10.2 | 144.7 |
| 2015/7/9 14:00:20 | A | 139.7306 | 35.3018 | 10.2 | 144.6 |
| ... | ... | ... | ... | ... | ... |

FIG. 8

| DATE AND TIME | AREA ID | BASE HOT SPOT INDEX | INTEGRATED HOT SPOT INDEX |
|---|---|---|---|
| 7/9/2015 14:00:00 | 1 | 0.1 | R1 |
| 7/9/2015 14:00:00 | 2 | 0 | R2 |
| 7/9/2015 14:00:00 | 3 | 0.3 | R3 |
| 7/9/2015 14:00:00 | 4 | 0 | R4 |
| 7/9/2015 14:00:00 | 5 | 0.2 | R5 |
| 7/9/2015 14:00:00 | 6 | 0 | R6 |
| 7/9/2015 14:00:00 | 7 | 0 | R7 |
| 7/9/2015 14:00:00 | 8 | 0 | R8 |
| 7/9/2015 14:00:00 | 9 | 0 | R9 |
| 7/9/2015 14:00:10 | 1 | 0.3 | R10 |
| 7/9/2015 14:00:10 | 2 | 0 | R11 |
| 7/9/2015 14:00:10 | 3 | 0.2 | R12 |
| 7/9/2015 14:00:10 | 4 | 0 | R13 |
| 7/9/2015 14:00:10 | 5 | 0.5 | R14 |
| 7/9/2015 14:00:10 | 6 | 0 | R15 |
| 7/9/2015 14:00:10 | 7 | 0.1 | R16 |
| 7/9/2015 14:00:10 | 8 | 0 | R17 |
| 7/9/2015 14:00:10 | 9 | 0 | R18 |
| ... | ... | ... | ... |

147

METHOD FOR CALCULATING DANGEROUS SPOT AND TIME, STORAGE MEDIUM, AND DEVICE FOR CALCULATING DANGEROUS SPOT

CROSS-REFERENCE TO RELATED APPLICATION

This application is a continuation application of International Application PCT/JP2019/005680 filed on Feb. 15, 2019 and designated the U.S., the entire contents of which are incorporated herein by reference.

FIELD

The present invention relates to a method for calculating a dangerous spot and time, a storage medium, and a device for calculating a dangerous spot and time.

BACKGROUND

A technology for calculating a hot spot index (index of a degree of danger of a hot spot) by calculating an index that quantifies a near-miss risk between vessels and adding this index spatially and temporally is disclosed (see, for example, Patent Document 1). Note that the "hot spot" mentioned here means a local sea area and time or a period, in which an index (risk value) indicating a possibility of a collision or near-miss between vessels is high in a predetermined period.

In such a technology, it is considered that there is a risk at a position and time in which a pair of vessels are closest to each other. Then, a risk value is accumulated for each sea area over a certain time width, and an accumulated risk value for each sea area where the risk value is accumulated is calculated. As a result, a dangerous spot and time are specified on the basis of the accumulated risk value. FIG. 16 is a diagram illustrating a reference example of a method for calculating an accumulated risk value of a hot spot. As illustrated in FIG. 16, "risk values" indicated by "circle" each included in a range of "+30 minutes" from "accumulation start time of the risk value" each indicated by "triangle" are integrated to calculate a "hot spot index" for each "accumulation start time of the risk value" (hereinafter referred to as hot spot index), which is indicated by "square".

Patent Document 1: International Publication Pamphlet No. WO 2018/193591

SUMMARY

According to an aspect of the embodiments, A method for calculating a dangerous spot and time for a computer to execute a process includes, detecting, by at least two mobile bodies, an avoidance action, which is an action that indicates a possibility that each mobile body has avoided a collision with another mobile body, based on locus data of a plurality of mobile bodies that belongs to a predetermined area; calculating an evaluation value that indicates a possibility that an avoidance action by one of the two mobile bodies has occurred under an influence of an avoidance action by another one; and calculating, based on the evaluation value, a collision risk in an area where a plurality of mobile bodies is concentrated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a data configuration of AIS accumulated data according to the embodiment.

FIG. 3 is a diagram illustrating an example of a data configuration of replenished AIS data according to the embodiment.

FIG. 4 is a diagram illustrating an example of a data configuration of base risk information according to the embodiment.

FIG. 5 is a diagram illustrating an example of a data configuration of base hot spot index information according to the embodiment.

FIG. 7 is a diagram illustrating an example of data complement processing according to the embodiment.

FIG. 8 is a diagram illustrating an example of a data configuration of hot spot index information according to the embodiment.

DESCRIPTION OF EMBODIMENTS

In a conventional technology for calculating a hot spot index, for example, it is considered that there is a risk at a position and time in which a pair of vessels are closest to each other, and a risk value of the pair of vessels is accumulated for each sea area to calculate the hot spot index. With this method, it is possible to consider not only a superficial state in which vessels are merely concentrated in a space, but also a risk of a collision or near-miss between vessels. Furthermore, since change in state with time is considered, it is possible to extract a "dynamic hot spot" that means a specific location that falls into a dangerous state at specific time or in a specific period, instead of a "static hot spot" that means a location that is dangerous at any time.

However, a dangerous spot, time, or period specified by the conventional technology for calculating a hot spot index may deviate from a feeling of an expert such as a captain or a vessel controller, and may not necessarily be dangerous. This is because the hot spot index is calculated on the basis of only a risk of a collision or near-miss between vessels, and a collision avoidance action (avoidance maneuvering) taken by each vessel is not considered.

The risk of a collision or near-miss between vessels is obtained by quantifying a possibility of a collision or near-miss between the vessels, and does not directly reflect a feeling of an expert such as a captain or a vessel controller. On the other hand, avoidance maneuvering is performed to avoid a collision or a near-miss by a captain or a vessel controller who has actually recognized danger of a collision or near-miss, and thus directly reflects a feeling of the captain or the vessel controller. In particular, in a hot spot, not only avoidance maneuvering is performed between two vessels but also avoidance maneuvering may occur in a chained manner or simultaneously. When such a situation occurs, it becomes difficult for each vessel to perform appropriate avoidance maneuvering based on autonomous decision, and it becomes also difficult for a vessel controller to give instructions to all vessels involved, making the situation extremely dangerous.

Figure 17:
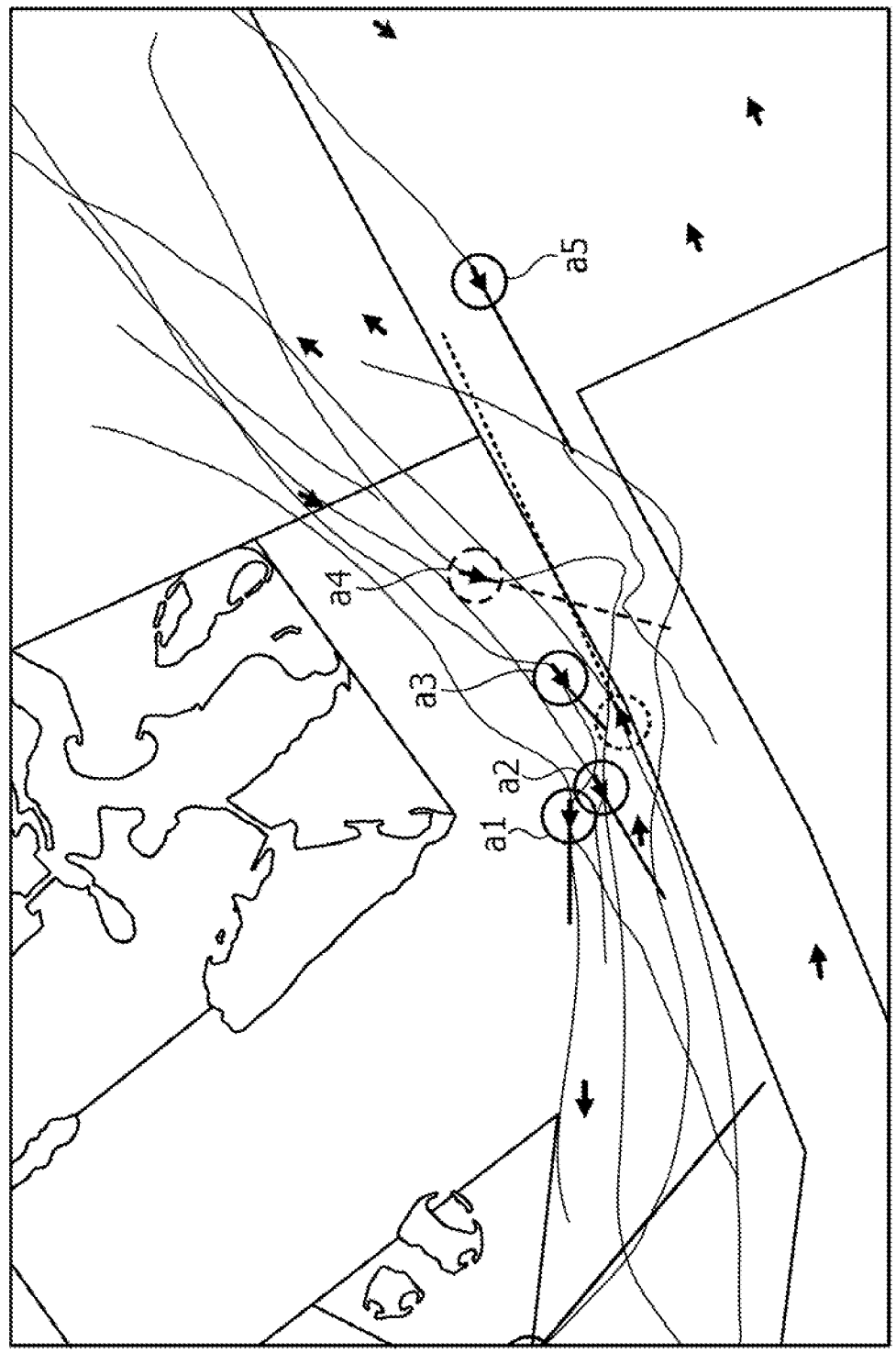
FIG. 17 is a diagram illustrating a case of a hot spot caused by occurrence of avoidance maneuvering in a chained manner or simultaneously.

Here, a case of a hot spot caused by occurrence of avoidance maneuvering in a chained manner or simultaneously will be described with reference to FIG. 17. FIG. 17 is a diagram illustrating the case of the hot spot caused by occurrence of avoidance maneuvering in a chained manner or simultaneously. Note that arrows in circles represent vessels.

In FIG. 17, when each of vessels denoted by reference signs a1 and a2 performs avoidance maneuvering, a vessel denoted by a reference sign a3 performs avoidance maneuvering in a chained manner. When the vessel a3 performs avoidance maneuvering, a vessel denoted by a reference sign a4 performs avoidance maneuvering in a chained manner. Furthermore, when the vessel a4 performs avoidance maneuvering, a vessel denoted by a reference sign a5 performs avoidance maneuvering in a chained manner. In this way, avoidance maneuvering occurs in a chained manner or simultaneously, and thus a controller determines that this sea area is a hot spot. For example, in a hot spot, avoidance maneuvering often occurs in a chained manner or simultaneously.

Therefore, it is difficult to appropriately recognize a dangerous spot and time by a method for calculating a hot spot index only from a risk value between vessels.

In one aspect, the present invention aims to more appropriately recognize a dangerous spot and time.

According to one embodiment, it becomes possible to more appropriately recognize a dangerous spot and time.

Hereinafter, embodiments of a method for calculating a dangerous spot and time, a device for calculating a dangerous spot and time, and a program for calculating a dangerous spot and time disclosed in the present application will be described in detail with reference to the drawings. Note that the following embodiments do not limit the present invention. Furthermore, in the following embodiments, a "hot spot" refers to a local sea area (for example, an area described later) and time or a period, in which a plurality of vessels including more than two vessels is included and there is a high collision risk.

Embodiments

[Configuration of Hot Spot Calculation Device]

Figure 1:
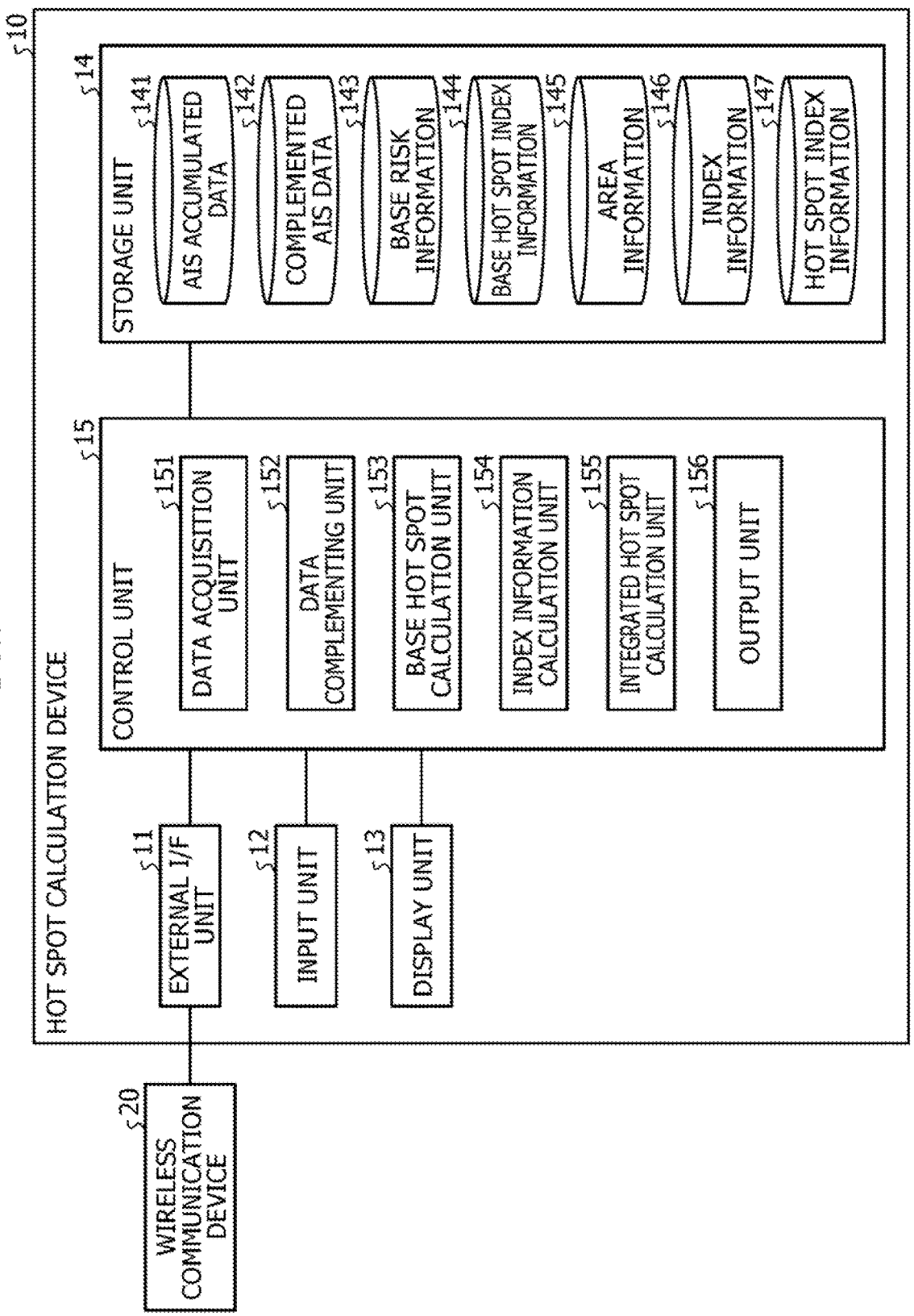
FIG. 1 is a functional block diagram illustrating a configuration of a hot spot calculation device according to an embodiment.

FIG. 1 is a functional block diagram illustrating a configuration of a hot spot calculation device according to an embodiment. As illustrated in FIG. 1, a hot spot calculation device 10 is a device that supports navigation of a vessel in a hot spot. In such a hot spot, many vessels interact with each other. Thus, once a hotspot is formed, it becomes difficult to eliminate a dangerous state by decision of each captain or an instruction of a controller. Therefore, it is important to predict formation of a hot spot in advance or prevent formation of a hot spot beforehand. The hot spot calculation device 10 is a device that may support the prediction in advance or prevention beforehand of formation of a hot spot, among supports for navigation of a vessel. Note that the hot spot calculation device 10 is an example of a device for calculating a dangerous spot and time.

The hot spot calculation device 10 combines a risk value related to a collision in a hot spot of an existing method with interactive information such as a spreading effect that avoidance maneuvering causes avoidance maneuvering by another vessel, to calculate a risk value that reflects a danger level felt at an actual site. The "avoidance maneuvering" mentioned here means maneuvering a vessel to avoid a collision between vessels. Furthermore, the risk value that reflects a danger level felt at an actual site mentioned here is referred to as an "integrated hot spot index", which will be described later. Note that, furthermore, the actual site mentioned here means, for example, a captain on a maneuvering side or a controller on a navigation control side.

The hot spot calculation device 10 is mounted on, for example, a computer such as a server disposed in a land facility or a computer disposed on a vessel. The land facility mentioned here means a marine traffic center or port traffic control room in charge of monitoring and providing information regarding vessels on the sea. The hot spot calculation device 10 includes an external interface (I/F) unit 11, an input unit 12, a display unit 13, a storage unit 14, and a control unit 15.

The external I/F unit 11 is, for example, an interface that transmits and receives various types of information to and from another device. The external I/F unit 11 wirelessly communicates with each vessel via a wireless communication device 20 such as an antenna provided in the land facility, and transmits and receives various types of information to and from each vessel. For example, the external I/F unit 11 receives AIS information from each vessel via the wireless communication device 20.

The input unit 12 inputs various types of information. Examples of the input unit 12 include a device that receives input of operation made by a mouse, a keyboard, or the like. For example, the input unit 12 receives operation instructing start of various types of processing, and inputs operation information indicating received operation content to the control unit 15.

The display unit 13 displays various types of information. Examples of the display unit 13 include a device such as a liquid crystal display (LCD) or a cathode ray tube (CRT). For example, the display unit 13 displays various types of information.

The storage unit 14 is an external storage device such as a hard disk drive (HDD), a solid state drive (SSD), or an optical or magneto-optical disk. Note that the storage unit 14 may be a semiconductor memory element such as a random access memory (RAM), a flash memory, or a non volatile static random access memory (NVSRAM).

The storage unit 14 includes AIS accumulated data 141, complemented AIS data 142, base risk information 143, base hot spot index information 144, area information 145, index information 146, and hot spot index information 147. Each of the AIS accumulated data 141, the complemented AIS data 142, the base risk information 143, the base hot spot index information 144, the area information 145, and the hot spot index information 147 has a data format of a table, as an example. However, the present invention is not limited to this, and each of the AIS accumulated data 141, the complemented AIS data 142, the base risk information 143, the base hot spot index information 144, the area information 145, and the hot spot index information 147 may have another data format such as a comma separated values (CSV) format.

The AIS accumulated data 141 is data obtained by accumulating AIS information received from each vessel. The complemented AIS data 142 is data obtained by complementing AIS information in the AIS accumulated data 141 at predetermined time intervals. The predetermined time interval is, as an example, a one-second interval, but may be a second interval larger than one second in order to suppress an amount of data. In the embodiment, description will be made assuming that the predetermined time interval is a 10-second interval. The complemented AIS data 142 is generated by a data complementing unit 152, which will be described later.

Here, examples of data configurations of the AIS accumulated data 141 and complemented AIS data 142 will be described with reference to FIGS. 2 and 3.

FIG. 2 is a diagram illustrating an example of the data configuration of the AIS accumulated data according to the embodiment. As illustrated in FIG. 2, the AIS accumulated data 141 is information in which longitude, latitude, a speed, and a course are associated with a date and time and a vessel identifier (ID). Note that each item of the AIS accumulated data 141 illustrated in FIG. 2 is an example, and another item may be included.

The vessel ID is identification information that uniquely identifies a vessel. Furthermore, the course is assumed to have an angle based on a predetermined direction (0 degree). For example, the course has a clockwise angle with respect to the north direction.

As an example, in a case where the date and time is "7/9/2015 14:00:09" and the vessel ID is "A", "139.7303" is stored as the longitude, "35.3023" is stored as the latitude, "10.2" is stored as the speed, and "144.7" is stored as the course.

FIG. 3 is a diagram illustrating an example of the data configuration of the replenished AIS data according to the embodiment. As illustrated in FIG. 3, the complemented AIS data 142 has the data configuration similar to that of the AIS accumulated data 141. Here, the complemented AIS data 142 is complemented at 10-second intervals.

As an example, in a case where the date and time is "7/9/2015 14:00:09" and the vessel ID is "A", "139.7300" is stored as the longitude, "35.3026" is stored as the latitude, "10.2" is stored as the speed, and "144.9" is stored as the course. Furthermore, in a case where the date and time is "7/9/2015 14:00:10" and the vessel ID is "A", "139.7303" Is stored as the longitude, "35.3022" is stored as the latitude, "10.2" is stored as the speed, and "144.7" is stored as the course.

Returning to FIG. 1, the base risk information 143 is information regarding a risk value that is calculated by a predetermined method and represents, in a numerical form, a collision risk of vessels at each time point when two vessels are paired. The risk value calculated by the predetermined method is hereinafter referred to as "base risk value". Note that the predetermined method is, for example, a method disclosed in International Publication Pamphlet No. WO 2018/193591, in which a risk value indicating a possibility of a collision risk in a case where it is considered that there is a collision risk at a position and time in which two vessels are closest to each other is calculated. Furthermore, the predetermined method is not limited to this, and may be any method as long as it is an existing method for calculating a collision risk of vessels. Note that the base risk information 143 is generated by a base hot spot calculation unit 153, which will be described later.

Here, an example of a data configuration of the base risk information 143 will be described with reference to FIG. 4. FIG. 4 is a diagram illustrating an example of the data configuration of the base risk information according to the embodiment. As illustrated in FIG. 4, the base risk information 143 is information in which a date and time, a vessel ID #1, a vessel ID #2, and a base risk value are associated with each other. Note that each item of the base risk information 143 illustrated in FIG. 4 is an example, and another item may be included.

The vessel ID #1 is identification information that uniquely identifies one of a pair of vessels. The vessel ID #2 is identification information that uniquely identifies the other of the pair of vessels. The date and time is a date and time of maneuvering the vessels. The base risk value is a risk value of the vessels as of a time point at which the vessel ID #1 and vessel ID #2 are closest to each other, and is a risk value calculated by the predetermined method described above.

As an example, in a case where the date and time is "7/9/2015 14:00:00", "A" is stored as the vessel ID #1, "B" is stored as the vessel ID #2, and "0.1" is stored as the base risk value. Furthermore, in a case where the date and time is "7/9/2015 14:00:00", "A" Is stored as the vessel ID #1, "C" is stored as the vessel ID #2, and "0.0" is stored as the base risk value.

Returning to FIG. 1, the base hot spot index information 144 is information regarding a hot spot index serving as a base. The hot spot index serving as a base will be hereinafter referred to as a "base hot spot index". The base hot spot index information 144 is, for example, information including a base hot spot index for each area (sea area), which is obtained by accumulating a base risk value for each area (sea area) over a predetermined optimum time width by the method disclosed in International Publication Pamphlet No. WO 2018/193591 described above. Furthermore, the method for calculating a base hot spot index is not limited to this, and may be any method as long as it is an existing method for calculating a hot spot index. Note that the base hot spot index information 144 is generated by the base hot spot calculation unit 153, which will be described later.

Here, an example of a data configuration of the base hot spot index information 144 will be described with reference to FIG. 5. FIG. 5 is a diagram illustrating an example of the data configuration of the base hot spot index information according to the embodiment. As illustrated in FIG. 5, the base hot spot index information 144 is information in which a date and time, an area identifier (ID), and a base hot spot index are associated with each other. Note that each item of the base hot spot index information 144 illustrated in FIG. 5 is an example, and another item may be included.

The date and time indicates time corresponding to the base hot spot index. The date and time indicates, for example, accumulation start time in a case where the base hot spot index is calculated by International Publication Pamphlet No. WO 2018/193591 described above. The area ID is identification information corresponding to a sea area. Note that the area ID will be described later. The base hot spot index is a base hot spot index of a sea area and date and time indicated by the area ID.

As an example, in a case where the date and time is "7/9/2015 14:00:00", "1" is stored as the area ID, and "0.1" Is stored as the base hot spot index. In a case where the date and time is "7/9/2015 14:00:10", "1" is stored as the area ID, and "0.3" is stored as the base hot spot index.

Returning to FIG. 1, the area information 145 is various types of information regarding an area obtained by dividing a target sea area into areas (sea areas) each having a predetermined size. The target sea area indicates a sea area selected by a controller in a land facility or a captain on a vessel.

Figure 6:
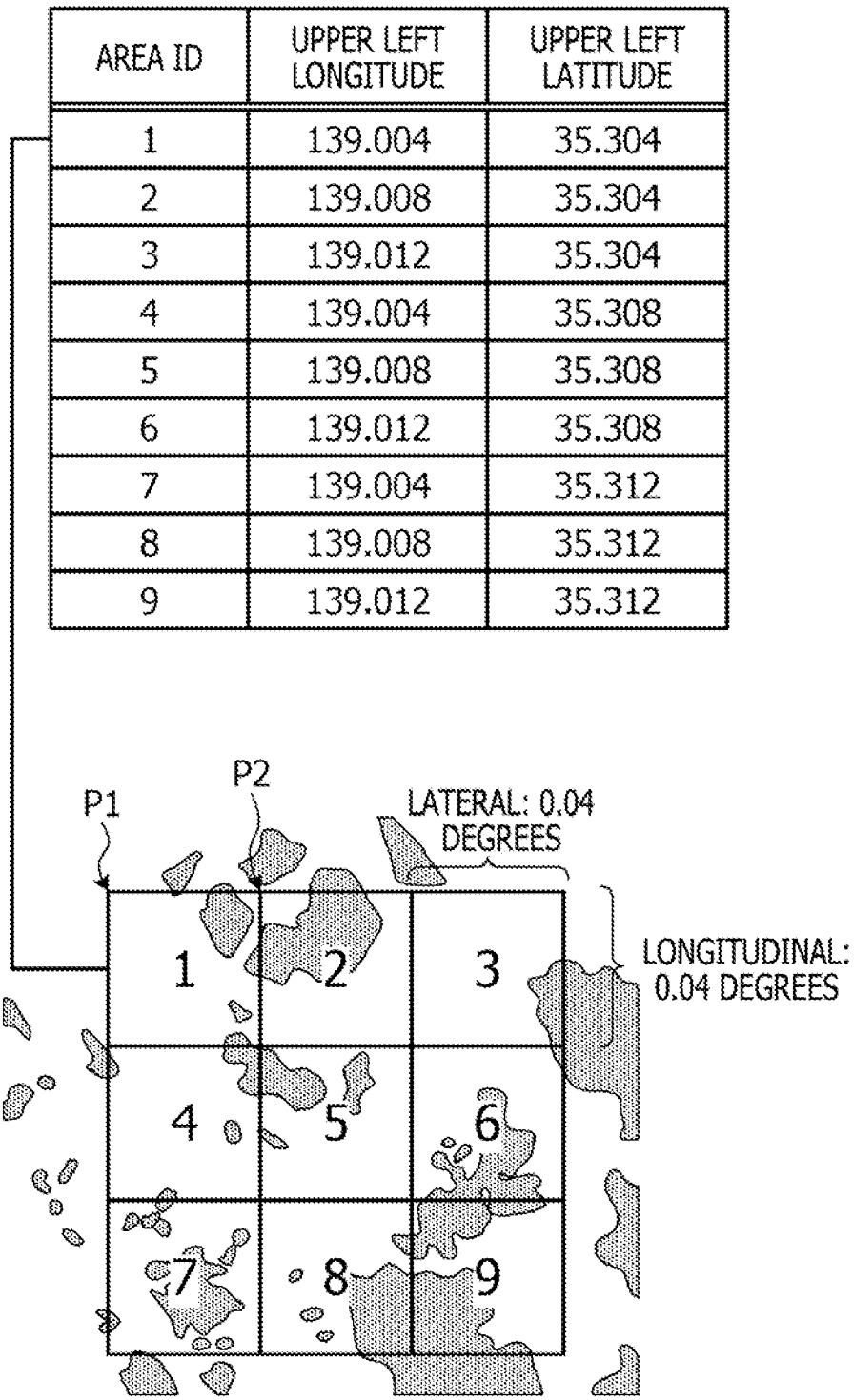
FIG. 6 is a diagram illustrating an example of a data configuration of area information according to the embodiment.

Here, an example of a data configuration of the area information 145 will be described with reference to FIG. 6. FIG. 6 is a diagram illustrating an example of the data configuration of the area information according to the embodiment. As illustrated in the upper diagram of FIG. 6, the area information 145 is information in which an area ID, upper left longitude, and upper left latitude are associated with each other. Note that each item of the area information 145 illustrated in the upper diagram of FIG. 6 is an example, and another item may be included.

The area ID is identification information that identifies an area of a target sea area. The area ID corresponds to the area ID of the base hot spot index information 144. The area ID is assigned to the area as identification information that identifies each area. The upper left longitude indicates longitude of a position of an upper left vertex among vertexes of the area. The left latitude indicates latitude of the position of the upper left vertex among the vertexes of the area. The upper left indicates, for example, a northwesternmost point in the area.

As illustrated in the lower diagram of FIG. 6, in a case where a shape of an area is a rectangle, area IDs of areas obtained by dividing a target sea area into areas each having a predetermined size are associated with "1" to "9". The upper left longitude and upper left latitude when the area ID is "1" correspond to P1. As an example, in a case where the area ID is "1", "139.004" is stored as the upper left longitude and "35.304" is stored as the upper left latitude. The upper left longitude and upper left latitude when the area ID is "2" correspond to P2. As an example, in a case where the area ID is "2", "139.008" is stored as the upper left longitude and "35.304" is stored as the upper left latitude. Note that, in FIG. 6, the shape of the area is a rectangle, but the shape is not limited to a rectangle. For example, the shape of the area may be a polygon such as a triangle or a hexagon. The area is not limited to be identified by the upper left longitude and the upper left latitude. For example, the area may be identified by latitude and longitude of a position of each vertex of the area. Furthermore, a width of one side of the area is assumed to be 0.04 degrees indicated by latitude and 0.04 degrees indicated by longitude, but the width is not limited to this.

Returning to FIG. 1, the index information 146 is information regarding various indexes indicating interactive information of a plurality of vessels. The index information 146 is indicated for each area (sea area). Examples of the interactive information of a plurality of vessels include information indicating the spread of avoidance maneuvering, in which one avoidance maneuvering causes another avoidance maneuvering, and information indicating simultaneous occurrence of avoidance maneuvering. Furthermore, the number of pairs of vessels in a track crossing relationship, and the number of pairs of vessels in a track intersecting relationship, which cause avoidance maneuvering, are included. Furthermore, a degree of avoidance maneuvering by change in orientation of a vessel, a degree of avoidance maneuvering by sudden deceleration, and the like are included. Note that the interactive information of a plurality of vessels described above is an example, and the present invention is not limited to this. Furthermore, the index information 146 is calculated by an index information calculation unit 154, which will be described later.

Here, the index information will be described.

Examples of one index information include information indicating the spread of avoidance maneuvering (index information A). In an area extracted as a hot spot, avoidance maneuvering to avoid a collision of vessels may be caused with a time delay. Thus, such interactive information indicating a spreading effect of avoidance maneuvering is calculated as the index information.

Examples of one index information include information indicating simultaneous occurrence of avoidance maneuvering (index information B). In an area extracted as a hot spot, avoidance maneuvering to avoid a collision of vessels may be caused simultaneously. Thus, such interactive information indicating a spreading effect of avoidance maneuvering is calculated as the index information.

Examples of one index information include the number of pairs of vessels in a track crossing relationship (index information C). In an area extracted as a hot spot, tracks of two vessels may intersect (cross) at an angle close to a right angle. Thus, such number of pairs of vessels in a track crossing relationship is calculated as the index information.

Examples of one index information include the number of pairs of vessels in a vessel intersecting relationship (index information D). In an area extracted as a hot spot, tracks of two vessels may intersect, although there is no limit to an angle of intersection. Thus, such number of pairs of vessels in a vessel intersecting relationship is calculated as the index information.

Examples of one index information include a degree of avoidance maneuvering by change in orientation (course over ground) of a vessel (index information E). In a case of avoidance maneuvering with a margin, the change in orientation of a vessel is minimized. On the other hand, extreme change in course, such as one turn or a 180-degree turn of orientation of a vessel, is estimated to be a state where there is no margin in avoidance maneuvering and a state where a danger level is high, even at an actual site. Thus, an accumulation of the degree of change in orientation (course over ground) of a vessel for each of a plurality of vessels is calculated as the index information.

Examples of one index information include a degree of avoidance maneuvering by sudden deceleration (Index information F). During avoidance maneuvering, it is common to change a course without changing a speed as much as possible. On the other hand, sudden deceleration due to, for example, reverse rotation of a propeller screw is estimated to be a state where there is no margin in avoidance maneuvering and a state where a danger level is high even at an actual site. Thus, an accumulation of deceleration during avoidance maneuvering for each of a plurality of vessels is calculated as the index information.

The hot spot index information 147 is information indicating a result of calculating an integrated hot spot index by combining a base hot spot index and various types of index information. The integrated hot spot index means the "integrated hot spot index" described above. The hot spot index information 147 is indicated for each area. Note that the hot spot index information 147 is calculated by an integrated hot spot calculation unit 155.

The control unit 15 corresponds to an electronic circuit such as a central processing unit (CPU). In addition, the control unit 15 includes an internal memory for storing programs defining various processing procedures and control data, and executes a variety of types of processing by using the programs and the control data. The control unit 15 includes a data acquisition unit 151, the data complementing unit 152, the base hot spot calculation unit 153, the index information calculation unit 154, the integrated hot spot calculation unit 155, and an output unit 156. Note that the index information calculation unit 154 is an example of a detection unit and a first calculation unit. The integrated hot spot calculation unit 155 is an example of a second calculation unit.

The data acquisition unit 151 acquires various types of data. For example, the data acquisition unit 151 acquires AIS information from each vessel via the wireless communication device 20. The data acquisition unit 151 stores the acquired AIS information in the AIS accumulated data 141. Note that, although the data acquisition unit 151 has been described as acquiring the AIS information from each vessel, the present invention is not limited thereto. The AIS information may be stored in an external storage device such as a storage device or a cloud. In such a case, it is sufficient that the data acquisition unit 151 acquires AIS information of each vessel from the external storage device.

The data complementing unit 152 complements AIS information in the AIS accumulated data 141 at predetermined time intervals. For example, the data complementing unit 152 complements the AIS information in the AIS accumulated data 141 for each vessel, as an example, at one-second intervals. The reason why the AIS information in the AIS accumulated data 141 is complemented at predetermined time intervals is as follows. This is to match a date and time of AIS information in each vessel because, although AIS information is transmitted from each vessel, a period in which the AIS information is transmitted is different in each vessel, and the AIS information is transmitted asynchronously even in the same vessel. As to the complementation at one-second intervals, it is sufficient that interpolation is performed between AIS information already existing in the AIS accumulated data 141 and AIS information so as to be linearly complemented. Then, the data complementing unit 152 thins out AIS information so that complemented AIS accumulated data 141' includes data for every 10 seconds for each vessel, as an example, and stores remaining AIS information obtained by the thinning out in the complemented AIS data 142. The reason for thinning out AIS information is to suppress increase in an amount of data.

Here, an example of data complement processing performed by the data complementing unit 152 will be described with reference to FIG. 7. FIG. 7 is a diagram illustrating an example of the data complement processing according to the embodiment. Note that, in FIG. 7, a case is described where AIS information in the AIS accumulated data 141 illustrated in FIG. 2 is complemented at 10-second intervals. Highlighted information in a table illustrated in the upper diagram of FIG. 7 is AIS information already existing in the AIS accumulated data 141.

Under such circumstances, the data complementing unit 152 complements the AIS information in the AIS accumulated data 141 at one-second intervals. The complemented AIS accumulated data 141' is generated. Here, the data complementing unit 152 interpolates between AIS information of "7/9/2015 14:00:00" and AIS information of "7/9/2015 14:00:18". Furthermore, the data complementing unit 152 interpolates between AIS information of "7/9/2015 14:00:19" and AIS information of "7/9/2015 14:00:27".

Then, the data complementing unit 152 thins out the AIS information so that the complemented AIS accumulated data 141' includes data for every 10 seconds for each vessel. Remaining AIS information obtained by the thinning out is stored in the complemented AIS data 142. Here, the data complementing unit 152 thins out the AIS information so that complemented AIS accumulated data 141' includes data for every 10 seconds from "7/9/2015 14:00:00", and generates the complemented AIS data 142 illustrated in the lower diagram of FIG. 7.

Returning to FIG. 1, the base hot spot calculation unit 153 calculates a hot spot index serving as a base in each area on a target sea area and at each time point.

For example, the base hot spot calculation unit 153 receives an instruction from a user about a period and target sea area, for which a base hot spot index should be calculated. Then, the base hot spot calculation unit 153 refers to the complemented AIS data 142 to extract all pairs of vessels that have navigated in the instructed target sea area in the instructed period. The base hot spot calculation unit 153 calculates, for all the extracted pairs of vessels, base risk values at all time points in the instructed period. It is sufficient that each base risk value is calculated by the predetermined method described above for calculating a collision risk of vessels. Then, the base hot spot calculation unit 153 stores each calculated base risk value in the base risk information 143.

Then, the base hot spot calculation unit 153 refers to the base risk information 143 to accumulate, for each area (sea area) in the target sea area and for the instructed period, a base risk value within a predetermined time range, and uses a value obtained by the accumulation as a base hot spot index. The predetermined time range means a time range when one base hot spot index is calculated. Examples of the predetermined time range include, but are not limited to, 10 seconds, 30 seconds, 1 minute, and 30 minutes. Note that, in the embodiment, description will be made assuming that the predetermined time range is 10 seconds. It is sufficient that the base hot spot index is calculated by the method described above for calculating a hot spot index. Then, the base hot spot calculation unit 153 stores each calculated base hot spot index in the base hot spot index information 144.

The index information calculation unit 154 calculates various types of index information in each area on a target sea area and each time range. The "time range" mentioned here means a time range when a base hot spot index is calculated. In each of the following examples, a case will be described where the index information calculation unit 154 calculates various types of index information for one area (A0) and a time range (T0) from one date and time.

As an example, the index information calculation unit 154 calculates, as the index information (A), information indicating the spread of avoidance maneuvering. For example, the index information calculation unit 154 refers to the complemented AIS data 142 and the base risk information 143 to detect avoidance maneuvering by sudden change in orientation of a vessel, and to detect avoidance maneuvering with a time delay of a vessel closest to the vessel performing the detected avoidance maneuvering. Then, the index information calculation unit 154 calculates, as the index information (A), a degree of the spread of avoidance maneuvering on the basis of a degree of change in orientation of each vessel performing the detected avoidance maneuvering. Although the index information calculation unit 154 detects avoidance maneuvering by change in orientation of a vessel, the index information calculation unit 154 may detect avoidance maneuvering by deceleration of a vessel. Note that a method for calculating the index information (A) in a case where avoidance maneuvering by change in orientation of a vessel is detected will be described later.

As another example, the index information calculation unit 154 calculates, as the index information (B), information indicating simultaneous occurrence of avoidance maneuvering. For example, the index information (A) is a case where there is a time delay in a spreading effect of avoidance maneuvering, and the index information (B) is a case where avoidance maneuvering occurs almost simultaneously in the spreading effect of avoidance maneuvering. For example, the index information calculation unit 154 refers to the complemented AIS data 142 and the base risk information 143 to detect avoidance maneuvering of a plurality of vessels by sudden change in orientation within a certain distance range and time range. Then, the index information calculation unit 154 calculates, as the index information (B), a degree of the spread of avoidance maneuvering on the basis of a degree of change in orientation of each vessel performing the detected avoidance maneuvering. The index information calculation unit 154 is not limited to the case of avoidance maneuvering by change in orientation of a vessel, and may be the case of avoidance maneuvering by deceleration of a vessel.

As another example, the index information calculation unit 154 calculates, as the index information (C), the number of pairs of vessels in a track crossing relationship. For example, the index information calculation unit 154 refers to the base risk information 143 to specify a pair of vessels having a base risk value exceeding a threshold. The threshold mentioned here indicates a threshold at which avoidance maneuvering is assumed to be started. The index information calculation unit 154 refers to the complemented AIS data 142 to determine whether or not tracks of the specified pair of vessels intersect each other at an angle within a predetermined angle range. The index information calculation unit 154 counts, within the time range T0, the number of pairs of vessels whose tracks are determined to intersect each other at an angle within the predetermined angle range. Note that it is sufficient that the predetermined angle range is an angle range close to 90 degrees.

As another example, the index information calculation unit 154 calculates, as the index information (D), the number of pairs of vessels in a track intersecting relationship. For example, the index information calculation unit 154 refers to the base risk information 143 to specify a pair of vessels having a base risk value exceeding a threshold. The threshold mentioned here indicates a threshold at which avoidance maneuvering is assumed to be started. The index information calculation unit 154 refers to the complemented AIS data 142 to determine whether or not tracks of the specified pair of vessels intersect each other. For example, the index information (D) is a case where an angle of the intersection is not limited, unlike the case of the track crossing relationship of the index information (C). The index information calculation unit 154 counts, within the time range T0, the number of pairs of vessels whose tracks are determined to intersect each other.

As another example, the index information calculation unit 154 calculates, as the index information (E), a degree of avoidance maneuvering by change in orientation (course over ground) of a vessel. For example, the index information calculation unit 154 refers to the complemented AIS data 142 to extract, for each vessel, change in orientation (course over ground) of a vessel. The index information calculation unit 154 calculates a degree of change in orientation (course over ground) of a vessel for each vessel, which exceeds a threshold, and adds the degrees within the time range T0. The threshold mentioned here indicates a threshold at which orientation of a vessel is assumed to have changed greatly. For example, a case is assumed where, in an area A0, a degree of change in orientation of each of vessels A, B, and C exceeds a threshold within the same time range T0. In such a case, the index information calculation unit 154 adds the degrees of change in orientation of the vessels A, B, and C, and uses a value obtained by the addition as the index information (E) of the area A0 and the time range T0.

As another example, the index information calculation unit 154 calculates, as the index information (F), a degree of avoidance maneuvering by sudden deceleration. For example, the index information calculation unit 154 refers to the complemented AIS data 142 to extract, for each vessel, change in a speed of a vessel. The index information calculation unit 154 calculates a degree of deceleration of a vessel for each vessel, which exceeds a threshold, and adds the degrees within the time range T0. The threshold mentioned here indicates a threshold at which a speed of a vessel is assumed to have decreased. For example, a case is assumed where, in the area A0, a degree of deceleration of each of vessels A, B, and C exceed a threshold within the same time range T0. In such a case, the index information calculation unit 154 adds the degrees of deceleration of the vessels A, B, and C, and uses a value obtained by the addition as the index information (F) of the area A0 and the time range T0.

The integrated hot spot calculation unit 155 calculates an integrated hot spot index in each area on a target sea area and each time range on the basis of various types of index information calculated by the index information calculation unit 154 and a weight set for each piece of the index information. For example, the integrated hot spot calculation unit 155 corrects a base hot spot index on the basis of interactive information regarding avoidance maneuvering, or the like.

For example, the integrated hot spot calculation unit 155 calculates an integrated hot spot index by weighting various types of index information A to F for an area and time range corresponding to a base hot spot index. As an example, the integrated hot spot calculation unit 155 calculates an integrated hot spot index R by the following Equation (1) for an area and time range corresponding to a base hot spot index.

Integrated hot spot index $R$=base hot spot index+ Index information $A$×weight $W_A$+index information $B$×weight $W_B$+index information $C$×weight $W_C$+index information $D$×weight $W_D$+index information $E$×weight $W_E$+index information $F$×weight $W_F$    Equation (1)

Note that each weight is predetermined by a user, but may be modified as appropriate.

With this configuration, the integrated hot spot calculation unit 155 may calculate a collision risk that matches an on-site feeling by incorporating interactive information regarding avoidance maneuvering into calculation of a hot spot index. As a result, the integrated hot spot calculation unit 155 may make it possible to more appropriately recognize a hot spot which is a dangerous spot. Furthermore, the integrated hot spot calculation unit 155 may calculate a collision risk that matches an on-site feeling by incorporating interactive information regarding avoidance maneuvering as compared with the case of a predetermined method in which a base hot spot index is calculated by using a collision risk between two vessels.

The output unit 156 outputs an integrated hot spot index.

For example, the output unit 156 stores, for each date and time and area, a date and time, an area ID, a base hot spot index, and an integrated hot spot index in the hot spot index information 147 in association with each other. Note that various types of index information used when an integrated hot spot index is calculated may be added in association with the integrated hot spot index.

Furthermore, the output unit 156 may refer to the hot spot index information 147 to display, as a heat map, an integrated hot spot index of a specified sea area and specified time on the display unit 13. It is sufficient that the heat map is highlighted and displayed, for example, as the integrated hot spot index is higher. Note that the specified time may be current time.

[Example of Data Configuration of Hot Spot Index Information]

Here, an example of a data configuration of the hot spot index information 147 will be described with reference to FIG. 8. FIG. 8 is a diagram illustrating an example of the data configuration of the hot spot index information according to the embodiment. As illustrated in FIG. 8, the hot spot index information 147 is information in which a date and time, an area ID, a base hot spot index, and an integrated hot spot index are associated with each other. The base hot spot index matches the base hot spot index corresponding to the date and time and area ID of the base hot spot index information 144 (see FIG. 5). The integrated hot spot index may also be said to be a hot spot index obtained by correcting a base hot spot index corresponding to a certain area of a certain date and time.

As an example, in a case where the date and time is "7/9/2015 14:00:00", "1" is stored as the area ID, "0.1" is stored as the base hot spot index, and "R1" is stored as the integrated hot spot index. In a case where the date and time is "7/9/2015 14:00:10", "1" is stored as the area ID, "0.3" is stored as the base hot spot index, and "R10" is stored as the integrated hot spot index.

[Example of Index Calculation Processing]

Figure 9:
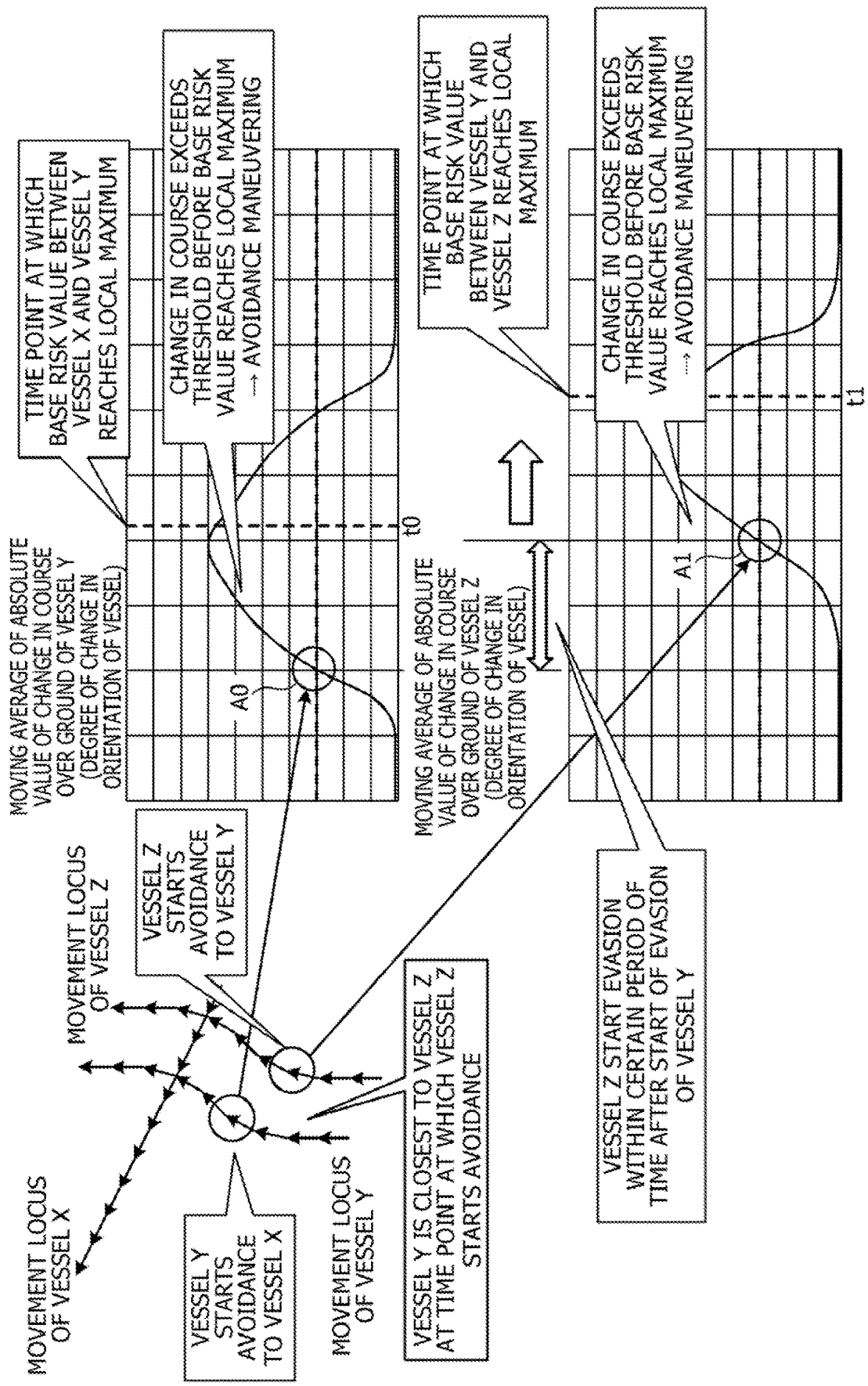
FIG. 9 is a diagram for describing index calculation processing according to the embodiment.

Here, an example of index calculation processing according to the embodiment will be described with reference to FIG. 9. FIG. 9 is a diagram for describing an example of the index calculation processing according to the embodiment.

[In Case of Index Information (A)]

In FIG. 9, a case will be described where the index information calculation unit 154 calculates, as the index information (A), information indicating the spread of avoidance maneuvering in a certain area and a certain time range. In the left diagram of FIG. 9, movement loci of a vessel X, a vessel Y, and a vessel Z are represented. Here, a case where avoidance maneuvering is spread by three types of vessels is illustrated. Specifically, the vessel X is navigating across routes of the vessel Y and vessel Z. Then, the vessel Y starts to perform avoidance to avoid the vessel X. Thereafter, the vessel Z starts to perform avoidance to avoid the vessel Y. Each of the start of avoidance of the vessel Y and the start of avoidance of the vessel Z is represented by a circle. It is assumed that the vessel Y is the closest to the vessel Z at a time point at which the vessel Z starts avoidance.

As illustrated in the right diagram of FIG. 9, under such circumstances, a degree of change in orientation of the vessel Y is represented in a graph. A degree of change in orientation of a vessel of the vessel Z is represented in a graph. Here, the degree of change in orientation of a vessel is represented by a moving average of an absolute value of change in course over ground.

Note that it is sufficient that the moving average of the absolute value of change in course over ground is obtained as follows. A time point t0 indicated by a dotted line is a time point at which a base risk value between the vessel X and the vessel Y reaches a local maximum. The index information calculation unit 154 refers to the base risk information 143 to extract the time point t0 at which the base risk value between the vessel X and the vessel Y reaches a local maximum, and to specify a certain period before and after the time point t0. The index information calculation unit 154 refers to the complemented AIS data 142 to extract, for the vessel Y, an amount of change in orientation (course over ground) of a vessel in the specified certain period. For example, the index information calculation unit 154 calculates a time difference of the course over ground. Then, the index information calculation unit 154 calculates an absolute value of the amount of change in orientation (course over ground) of a vessel, and calculates a moving average of the absolute value of the change in course over ground within a width of a certain period (a certain window width).

As illustrated in the upper right diagram of FIG. 9, the index information calculation unit 154 extracts a time point at which orientation of the vessel Y changes the most in a certain period immediately before the time point t0 at which the base risk value between the vessel X and the vessel Y reaches a local maximum. Here, a time point denoted by a reference sign A0 is the time point at which the orientation of the vessel Y changes the most. In a case where a degree of the change at the extracted time point exceeds a threshold (not illustrated), the index information calculation unit 154 estimates that this time point is a start timing of avoidance maneuvering. For example, the time point denoted by the reference sign A0 is a time point at which the vessel Y starts avoidance to avoid the vessel X.

As illustrated in the lower right diagram of FIG. 9, the index information calculation unit 154 extracts a time point at which orientation of the vessel Z changes the most in a certain period immediately before a time point ti at which a base risk value between the vessel Y and the vessel Z reaches a local maximum. Here, a time point denoted by a reference sign A1 is the time point at which the orientation of the vessel Z changes the most. In a case where a degree of the change at the extracted time point exceeds a threshold (not illustrated), the index information calculation unit 154 estimates that this time point is a start timing of avoidance maneuvering. For example, the time point denoted by the reference sign A1 is a time point at which the vessel Z starts avoidance to avoid the vessel Y.

Then, since the vessel Y which performs avoidance maneuvering is the closest to the vessel Z at the time point at which the vessel Z starts avoidance, the index information calculation unit 154 detects avoidance maneuvering with a time delay of the vessel Z. Then, the index information calculation unit 154 adds a degree of change in orientation (course over ground) of a vessel at the start timing of avoidance maneuvering of the vessel Y and a degree of change in orientation (course over ground) of a vessel at the start timing of avoidance maneuvering of the vessel Z. For example, the index information calculation unit 154 uses a value obtained by the addition as the index information (A) indicating the spread of avoidance maneuvering in a certain area and a certain time range.

[Example of Display by Output Processing]

Figure 10:
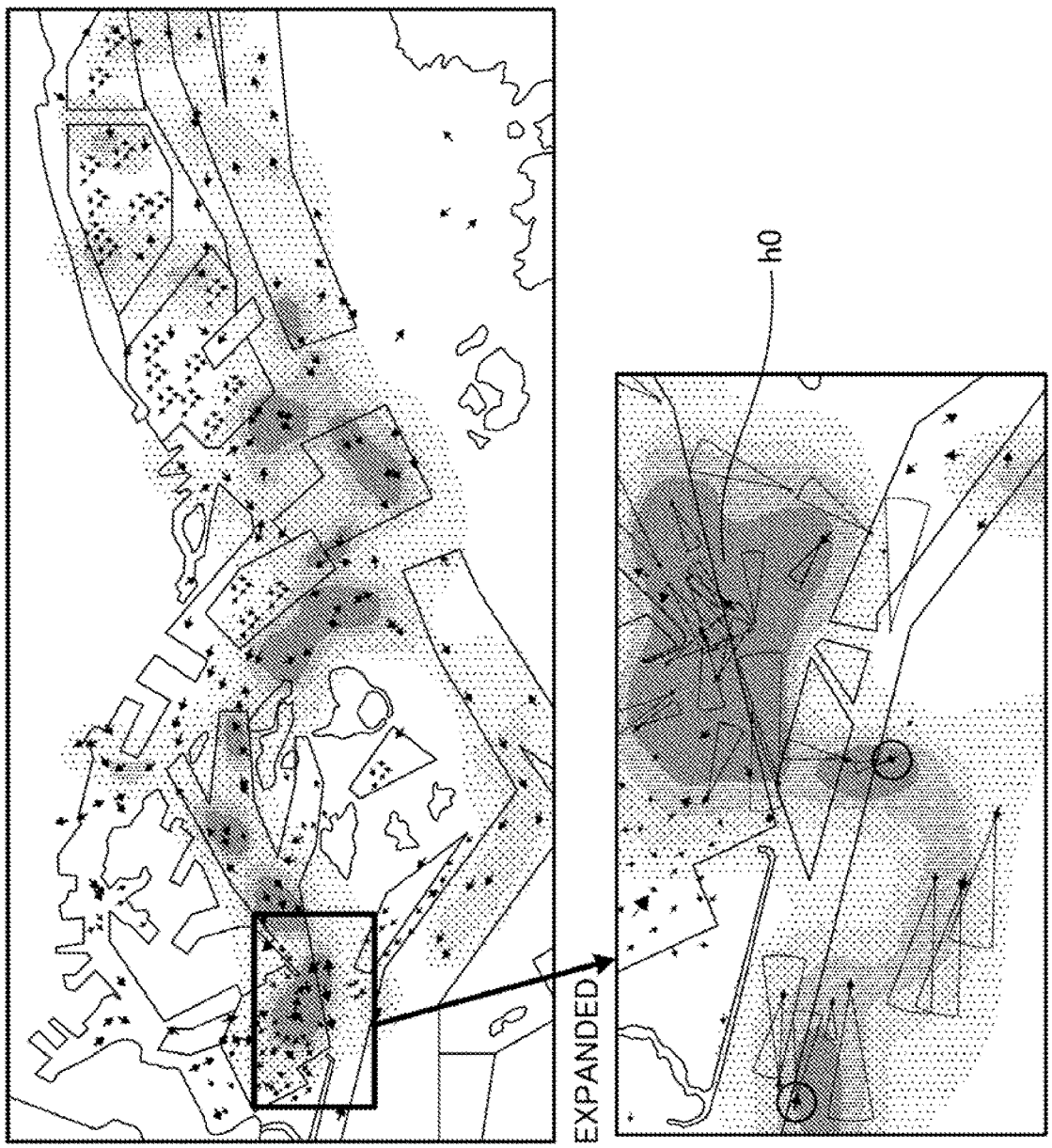
FIG. 10 is a diagram illustrating an example of display by output processing according to the embodiment.

FIG. 10 is a diagram illustrating an example of display by output processing according to the embodiment. Note that, in the upper diagram of FIG. 10, an integrated hot spot index of a specific area (sea area) and specific time is represented as a heat map. For example, the output unit 156 refers to the hot spot index information 147 to extract an integrated hot spot index of a specific area corresponding to specific time, and to display the integrated hot spot index as a heat map on the display unit 13. Here, in the heat map, an area where the integrated hot spot index is higher is represented by a pattern in which dot density is higher. Note that arrows are vessels.

Here, it is assumed that a user specifies an area. Then, the output unit 156 enlarges a heat map of the specified area and displays the enlarged heat map on the display unit 13. Here, it may be seen that an area group denoted by a reference sign h0 has the highest integrated hot spot index.

[Flowchart of Base Hot Spot Calculation Processing]

Figure 11:
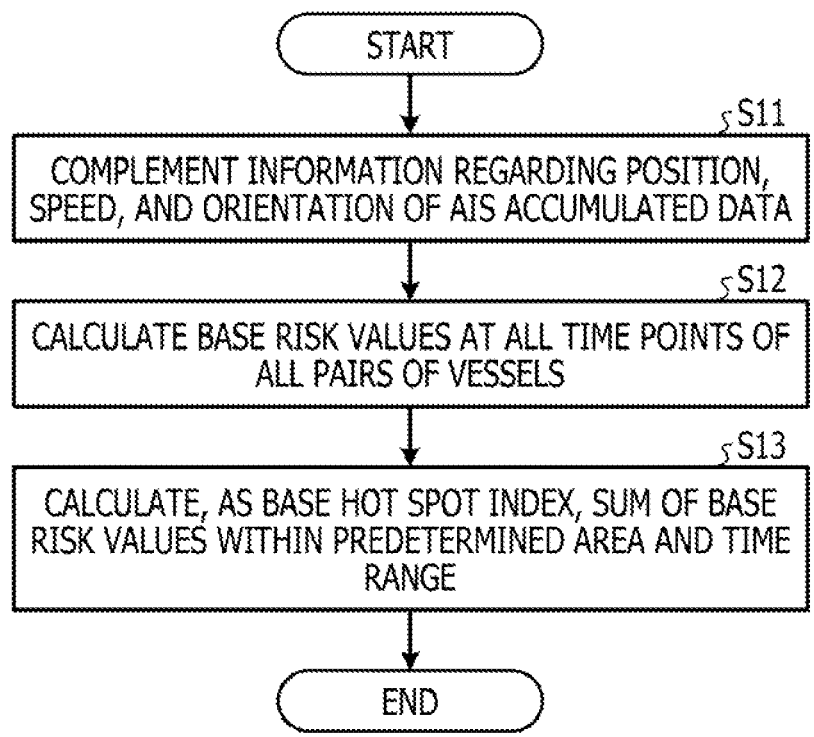
FIG. 11 is a diagram illustrating an example of a flowchart of base hot spot calculation processing according to the embodiment.

FIG. 11 is a diagram illustrating an example of a flowchart of base hot spot calculation processing according to the embodiment. Note that the AIS accumulated data 141 is assumed to be stored in the storage unit 14.

The data complementing unit 152 complements information regarding a position (longitude and latitude), a speed, and orientation (course) of the AIS accumulated data 141 (Step S11). For example, the data complementing unit 152, the AIS accumulated data 141 complements, as an example, AIS information in the AIS accumulated data 141 for each vessel at one-second intervals, as an example. Then, the data complementing unit 152 thins out AIS information so that complemented AIS accumulated data 141' includes data for every 10 seconds for each vessel, as an example, and stores remaining AIS information obtained by the thinning out in the complemented AIS data 142.

Then, the base hot spot calculation unit 153 calculates base risk values at all time points of all pairs of vessels (Step S12). For example, the base hot spot calculation unit 153 refers to the complemented AIS data 142 to extract all pairs of vessels. The base hot spot calculation unit 153 calculates base risk values at all time points for all the extracted pairs of vessels. Then, the base hot spot calculation unit 153 stores each calculated base risk value in the base risk information 143. Note that the base hot spot calculation unit 153 may calculate base risk values at all time points of all pairs of vessels in a period and target sea area for calculating a base risk value.

Then, the base hot spot calculation unit 153 calculates, as a base hot spot index, the sum of the base risk values in a predetermined area and time range (Step S13). For example, the base hot spot calculation unit 153 refers to the base risk information 143, the complemented AIS data 142, and the area information 145 to calculate a base hot spot index for each date and time and area of the target sea area as follows. For example, the base hot spot calculation unit 153 accumulates base risk values within a time range (for example, 10 seconds) from a date and time in the period, and uses a value obtained by the accumulation as a base hot spot index. Then, the base hot spot calculation unit 153 ends the base hot spot calculation processing.

[Flowchart of Index Information Calculation Processing]

Figure 12:
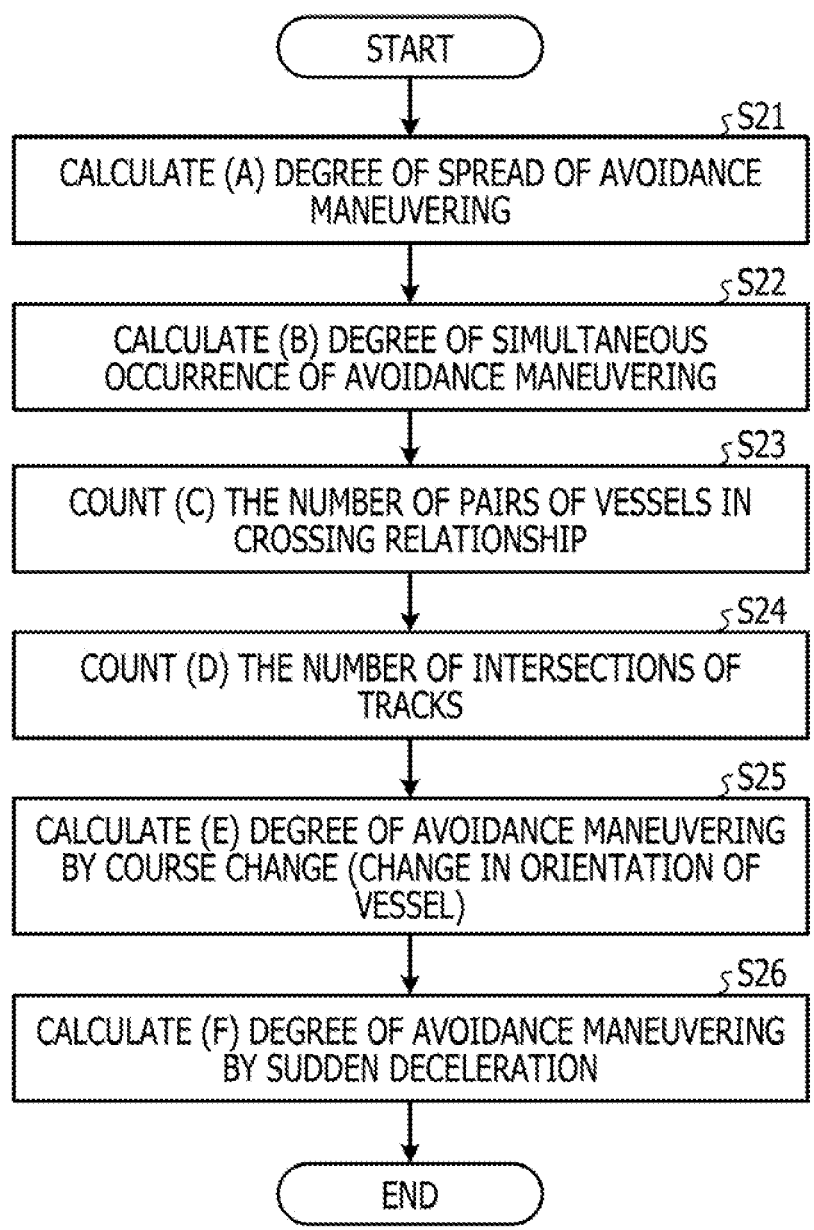
FIG. 12 is a diagram illustrating an example of a flowchart of index information calculation processing according to the embodiment.

FIG. 12 is a diagram illustrating an example of a flowchart of index information calculation processing according to the embodiment. Note that, in the flowchart of FIG. 12, the index information calculation processing for one area and one time range from a date and time will be described.

As illustrated in FIG. 12, the index information calculation unit 154 calculates (A) a degree of the spread of avoidance maneuvering (Step S21). For example, the index information calculation unit 154 refers to the complemented AIS data 142 and the base risk information 143 to detect avoidance maneuvering by sudden change in orientation of a vessel, and to detect avoidance maneuvering with a time delay of a vessel closest to the vessel performing the detected avoidance maneuvering. Then, the index information calculation unit 154 adds degrees of sudden change in orientation in the detected avoidance maneuvering. Then, the index information calculation unit 154 uses a degree of the spread obtained by the addition as the index information (A).

Then, the index information calculation unit 154 calculates (B) a degree of simultaneous occurrence of avoidance maneuvering (Step S22). For example, the index information calculation unit 154 refers to the complemented AIS data 142 and the base risk information 143 to detect avoidance maneuvering of a plurality of vessels by sudden change in orientation within a certain distance range and time range from a date and time. Then, the index information calculation unit 154 adds degrees of sudden change in orientation in the detected avoidance maneuvering. Then, the index information calculation unit 154 uses a degree of the spread obtained by the addition as the index information (B).

Then, the index information calculation unit 154 counts (C) the number of pairs of vessels in a track crossing relationship (Step S23). For example, the index information calculation unit 154 refers to the base risk information 143 to specify a pair of vessels having a base risk value exceeding a threshold. The threshold mentioned here indicates a threshold at which avoidance maneuvering is assumed to be started. The index information calculation unit 154 refers to the complemented AIS data 142 to determine whether or not tracks of the specified pair of vessels intersect each other at an angle within a predetermined angle range. The index information calculation unit 154 counts, within the time range from the date and time, the number of pairs of vessels whose tracks are determined to intersect each other at an angle within the predetermined angle range.

Then, the index information calculation unit 154 counts (D) the number of intersections of tracks (Step S24). For example, the index information calculation unit 154 refers to the base risk information 143 to specify a pair of vessels having a base risk value exceeding a threshold. The threshold mentioned here indicates a threshold at which avoidance maneuvering is assumed to be started. The index information calculation unit 154 refers to the complemented AIS data 142 to determine whether or not tracks of the specified pair of vessels intersect each other. The index information calculation unit 154 counts, within the time range from the date and time, the number of pairs of vessels whose tracks are determined to intersect each other.

Then, the index information calculation unit 154 calculates (E) a degree of avoidance maneuvering by course change (change in orientation of a vessel) (Step S25). For example, the index information calculation unit 154 refers to the complemented AIS data 142 to extract, for each vessel, change in orientation (course over ground) of a vessel. The index information calculation unit 154 calculates a degree of change in orientation (course over ground) of a vessel for each vessel, which exceeds a threshold, and adds the degrees within the time range from the date and time. The threshold mentioned here indicates a threshold at which orientation of a vessel is assumed to have changed greatly. The index information calculation unit 154 uses a value obtained by the addition as the degree of avoidance maneuvering by course change (change in orientation of a vessel).

Then, the index information calculation unit 154 calculates (F) a degree of avoidance maneuvering by sudden deceleration (Step S26). For example, the index information calculation unit 154 refers to the complemented AIS data 142 to extract, for each vessel, change in a speed of a vessel. The index information calculation unit 154 calculates a degree of deceleration of a vessel for each vessel, which exceeds a threshold, and adds the degrees within the time range from the date and time. The threshold mentioned here indicates a threshold at which a speed of a vessel is assumed to have decreased. The index information calculation unit 154 uses a value obtained by the addition as the degree of avoidance maneuvering by sudden deceleration.

Then, the index information calculation unit 154 ends the index information calculation processing.

[Flowchart of Integrated Hot Spot Calculation Processing]

Figure 13:
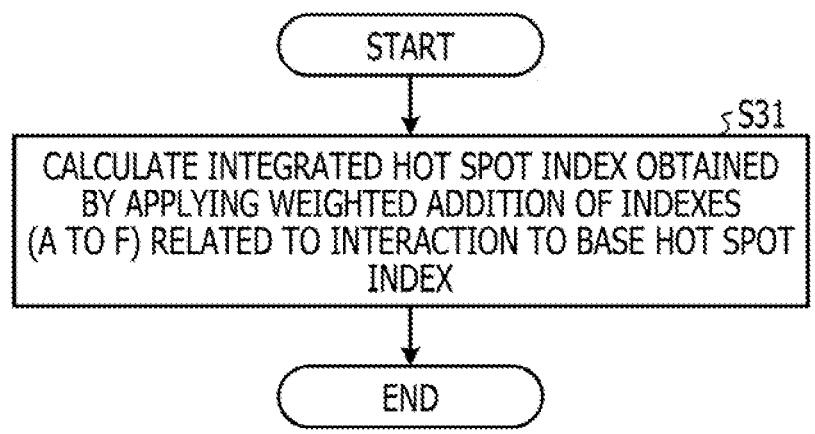
FIG. 13 is a diagram illustrating an example of a flowchart of integrated hot spot calculation processing according to the embodiment.

FIG. 13 is a diagram illustrating an example of a flowchart of integrated hot spot calculation processing according to the embodiment. Note that, in the flowchart of FIG. 13, the integrated hot spot calculation processing for calculating an integrated hot spot index for one area and one time range from a date and time will be described.

As illustrated in FIG. 13, the integrated hot spot calculation unit 155 calculates an integrated hot spot index obtained by applying weighted addition of the indexes (A to F) related to interaction to a base hot spot index (Step S31). For example, the integrated hot spot calculation unit 155 calculates, by using Equation (1), an integrated hot spot index obtained by correcting a base hot spot index. Then, the output unit 156 stores a date and time, an area ID, a base hot spot index, and an integrated hot spot index in the hot spot index information 147 in association with each other.

Then, the integrated hot spot calculation unit 155 ends the integrated hot spot calculation processing.

With this configuration, the integrated hot spot calculation unit 155 calculates a collision risk that matches an on-site feeling by incorporating interactive information regarding avoidance maneuvering, and may more appropriately extract a hot spot which is a dangerous spot.

Figure 14:
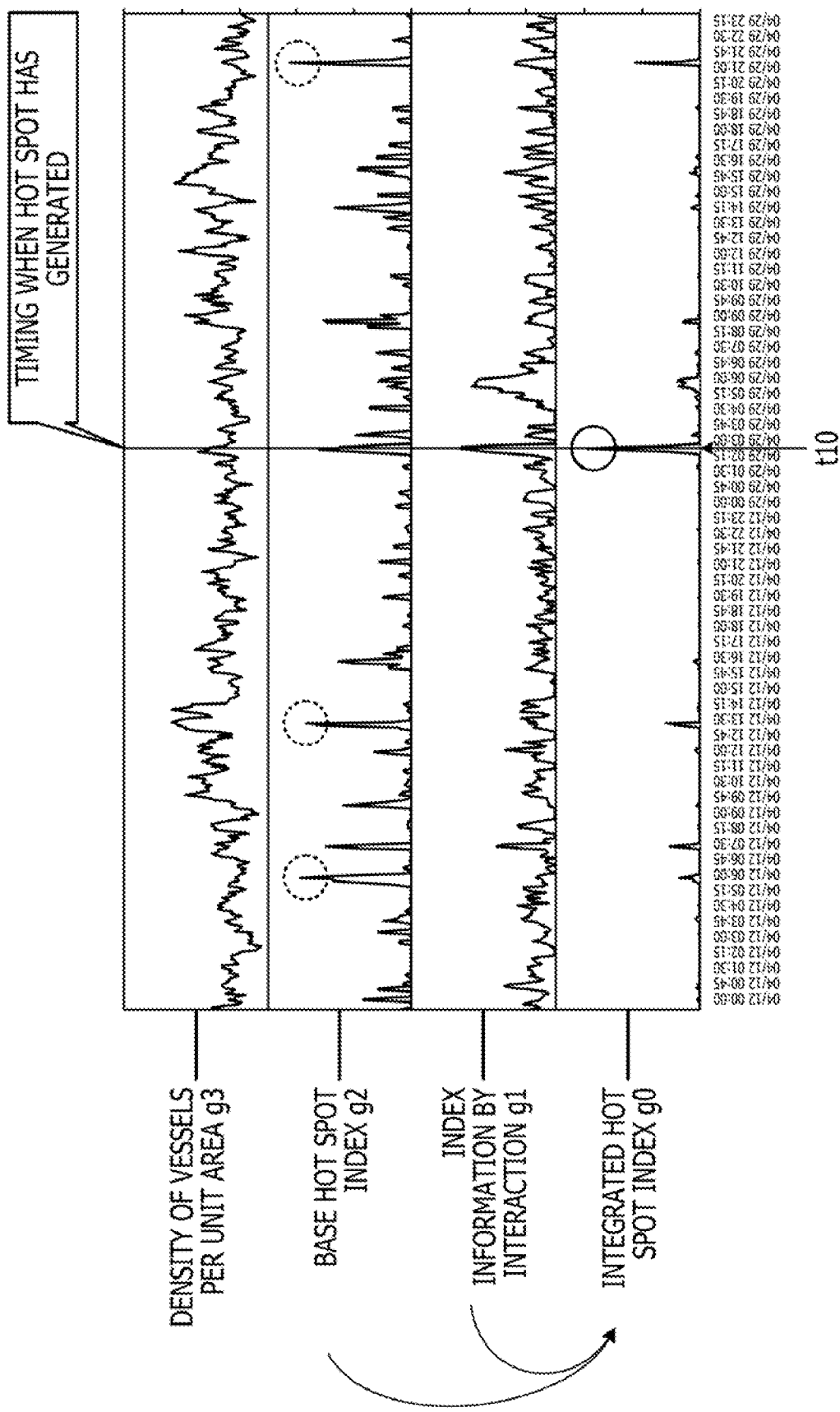
FIG. 14 is a diagram illustrating an example in which a hot spot may be more appropriately extracted by an integrated hot spot index according to the embodiment.

Here, an example in which a hot spot may be more appropriately extracted by an integrated hot spot index according to the embodiment will be described with reference to FIG. 14. FIG. 14 is a diagram illustrating an example in which a hot spot may be more appropriately extracted by an integrated hot spot index according to the embodiment. In FIG. 14, four graphs that change from moment to moment in a certain area are represented. In the topmost stage, a graph g3 indicating density of vessels per unit area is represented. In the second stage, a graph g2 indicating a base hot spot index is represented. In the third stage, a graph g1 of index information by interaction according to the embodiment is represented. In the fourth stage, a graph g0 of an integrated hot spot index according to the embodiment is represented.

A timing t10 is a timing when a hot spot state actually occurs. However, as indicated in the graph g2, the base hot spot index is high at the timing t10 when the hot spot state actually occurs, but the base hot spot index is also high at other timings (see broken lines of circles). Furthermore, as indicated in the graph g3, the density of the vessels is high at the timing t10 when the hot spot state occurs, but the hot spot state does not necessarily occur at the timing when the density of the vessels is high.

On the other hand, as indicated in the graph g1, the index information by the interaction is the highest at the timing t10 when the hot spot state actually occurs. In addition, as indicated in the graph g0, the integrated hot spot index is the highest at the timing t10 when the hot spot state actually occurs, and the integrated hot spot index is low at other timings. For example, the integrated hot spot calculation unit 155 may suppress peaks other than a timing of a hot spot by calculating an integrated hot spot index obtained by applying weighted addition of index information by interaction.

Note that various types of processing may be performed by using an integrated hot spot index. Examples of one processing include a case of using an integrated hot spot index for correct data to construct a prediction model of a future hot spot state. With this processing, the hot spot calculation device 10 may support prediction in advance or prevention beforehand of formation of a hot spot, among supports for navigation of a vessel. Furthermore, examples of another processing include a case of analyzing factors of a past hot spot state by using an integrated hot spot index. Furthermore, examples of another processing include a case where a route in an area with a high integrated hot spot index is reproduced and used for training of captains and controllers.

Effects of Embodiment

According to the embodiment described above, the hot spot calculation device 10 detects, by at least two mobile bodies, an avoidance action, which is an action that indicates a possibility that each mobile body has avoided a collision with another mobile body, on the basis of locus data of a plurality of mobile bodies that belongs to a predetermined area. The hot spot calculation device 10 calculates an evaluation value that indicates a possibility that an avoidance action by one of the two mobile bodies has occurred under an influence of an avoidance action by another one. The hot spot calculation device 10 calculates, on the basis of the evaluation value, a collision risk in an area where a plurality of mobile bodies is concentrated. According to such a configuration, the hot spot calculation device 10 may calculate a collision risk in a hot spot that matches an on-site feeling by using interactive information regarding a plurality of mobile bodies. For example, the hot spot calculation device 10 may extract a hot spot having a high degree of danger, where not only mobile bodies are merely concentrated but also a plurality of mobile bodies affects each other.

Furthermore, according to the embodiment described above, the hot spot calculation device 10 detects the avoidance action by each of a first mobile body and a second mobile body. The hot spot calculation device 10 determines whether or not a mobile body closest to the second mobile body at a time point at which the avoidance action of the second mobile body is detected is the first mobile body of which the avoidance action is detected. In a case where it is determined that the mobile body closest to the second mobile body at the time point is the first mobile body, the hot spot calculation device 10 calculates an evaluation value that indicates a possibility that the avoidance action by the second mobile body has occurred under an influence of the avoidance action by the first mobile body. According to such a configuration, the hot spot calculation device 10 may calculate interactive information regarding a plurality of mobile bodies by calculating an evaluation value that indicates a possibility that an avoidance action by one mobile body has occurred under an influence of an avoidance action by another mobile body. As a result, the hot spot calculation device 10 may extract hot spots having a high degree of danger of affecting each other.

Furthermore, according to the embodiment described above, the hot spot calculation device 10 further calculates an evaluation value that includes information that indicates whether or not loci of two mobile bodies are in a crossing relationship. According to such a configuration, the hot spot calculation device 10 may further calculate interactive information regarding a plurality of mobile bodies by calculating an evaluation value including information indicating whether or not loci of two mobile bodies are in a crossing relationship. As a result, the hot spot calculation device 10 may extract hot spots having a high degree of danger of affecting each other.

Furthermore, according to the embodiment described above, the hot spot calculation device 10 calculates the collision risk in the area by an existing predetermined method. The hot spot calculation device 10 corrects the collision risk in the area on the basis of the evaluation value. According to such a configuration, the hot spot calculation device 10 may calculate a collision risk in a hot spot that matches an on-site feeling by incorporating interactive information regarding a plurality of mobile bodies into calculation of a collision risk in a hot spot.

[Others]

Note that, in the embodiment, it has been described that the integrated hot spot calculation unit 155 calculates an integrated hot spot index by weighting various types of index information A to F for an area and time range corresponding to a base hot spot index. However, the integrated hot spot calculation unit 155 is not limited to this, and may calculate, for an area and time range corresponding to a base hot spot index, an integrated hot spot index by using interactive information itself indicating a spreading effect of avoidance maneuvering. For example, the integrated hot spot calculation unit 155 may calculate an integrated hot spot index by weighting the index information A and B.

Furthermore, each illustrated component of the hot spot calculation device 10 does not necessarily have to be physically configured as illustrated in the drawings. For example, specific aspects of separation and integration of the hot spot calculation device 10 are not limited to the illustrated ones, and all or a part of the hot spot calculation device 10 may be functionally or physically separated and integrated in an arbitrary unit according to various loads, use situations, or the like. For example, the data acquisition unit 151 and the data complementing unit 152 may be integrated as one unit. Furthermore, the index information calculation unit 154 may be separated into calculation units, each of which calculates various types of index information. Furthermore, the storage unit 14 may be connected by way of a network as an external device of the hot spot calculation device 10.

Figure 15:
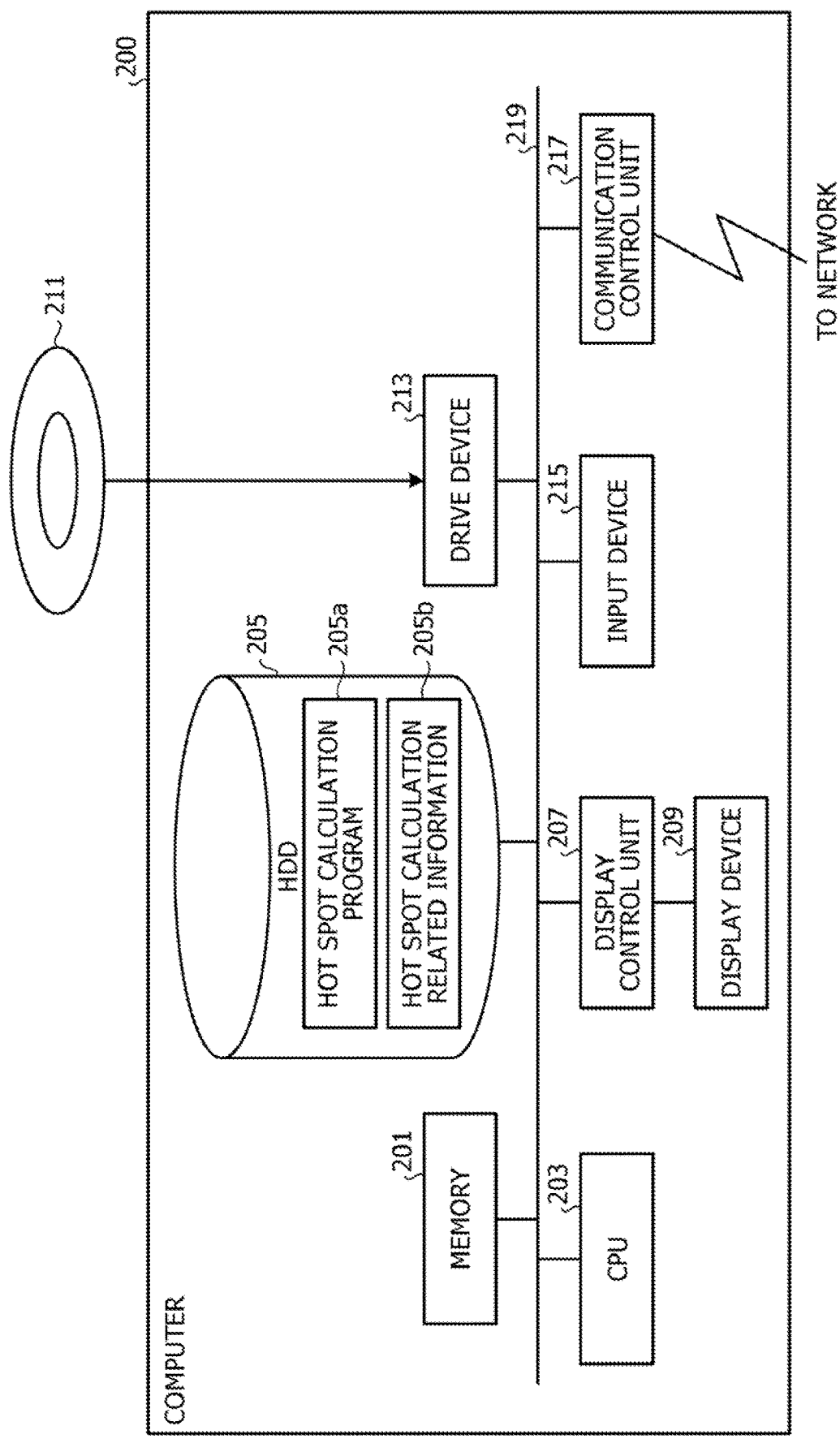
FIG. 15 is a diagram illustrating an example of a computer that executes a hot spot calculation program.
Figure 16:
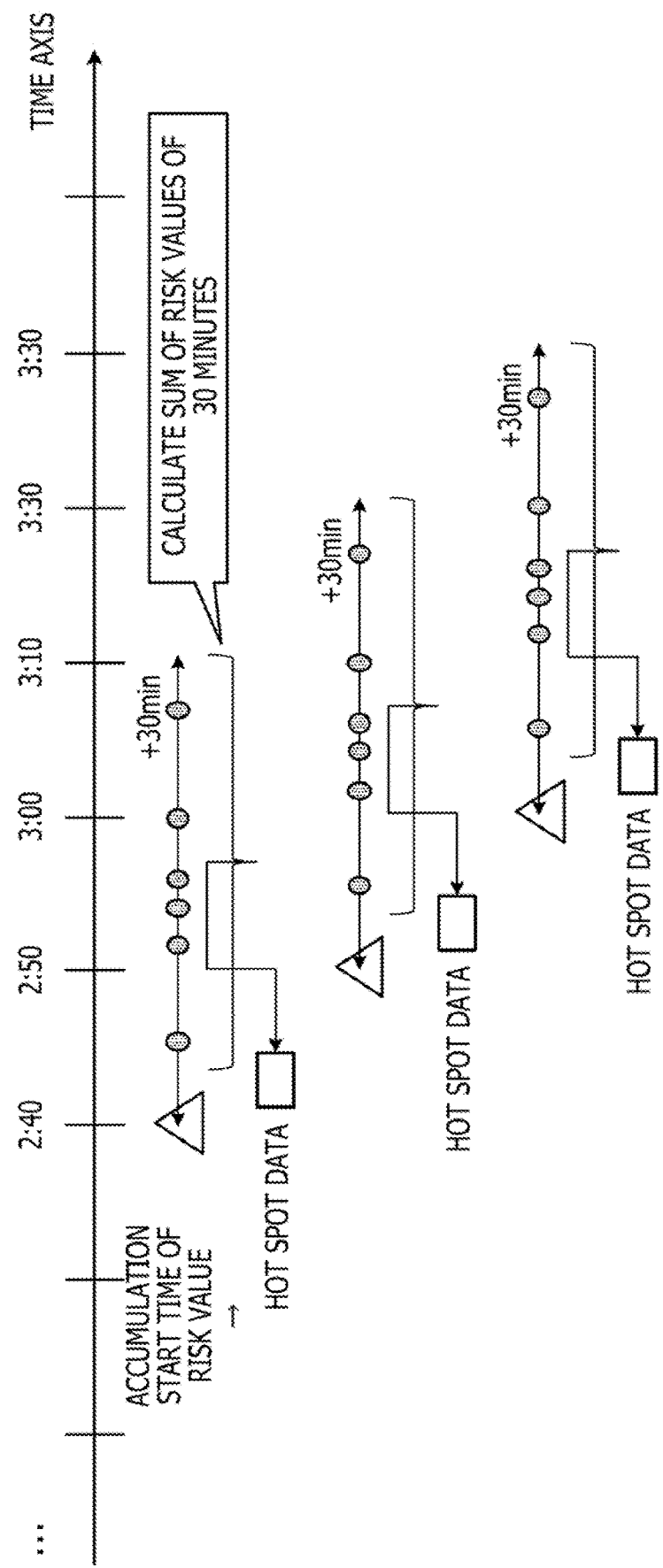
FIG. 16 is a diagram illustrating a reference example of a method for calculating an accumulated risk value of a hot spot.

Furthermore, various types of processing described in the embodiment described above may be implemented by a computer such as a personal computer or a workstation executing programs prepared in advance. Thus, in the following, an example of a computer that executes a hot spot calculation program that implements functions similar to the functions of the hot spot calculation device 10 illustrated in FIG. 1 will be described. FIG. 15 is a diagram illustrating an example of the computer that executes the hot spot calculation program.

As illustrated in FIG. 15, a computer 200 includes a CPU 203 that executes various types of arithmetic processing, an input device 215 that receives data input from a user, and a display control unit 207 that controls a display device 209. Furthermore, the computer 200 includes a drive device 213 that reads a program and the like from a storage medium, and a communication control unit 217 that exchanges data with another computer via a network. Furthermore, the computer 200 includes a memory 201 that temporarily stores various types of information and a hard disk drive (HDD) 205. In addition, the memory 201, the CPU 203, the HDD 205, the display control unit 207, the drive device 213, the input device 215, and the communication control unit 217 are connected by a bus 219.

The drive device 213 is a device for a removable disk 210, for example. The HDD 205 stores a hot spot calculation program 205a and a hot spot calculation related information 205b.

The CPU 203 reads the hot spot calculation program 205a, and expands the hot spot calculation program 205a in the memory 201 to execute the hot spot calculation program 205a as a process. Such a process corresponds to each functional unit of the hot spot calculation device 10. The hot spot calculation related information 205b corresponds to the AIS accumulated data 141, the complemented AIS data 142, the base risk information 143, the base hot spot index information 144, the area information 145, the index information 146, and the hot spot index information 147. In addition, for example, the removable disk 210 stores each piece of information such as the hot spot calculation program 205a.

Note that the hot spot calculation program 205a may not necessarily be stored in the HDD 205 from the beginning. For example, the program is stored in a "portable physical medium" such as a flexible disk (FD), a compact disk read only memory (CD-ROM), a digital versatile disk (DVD), a magneto-optical disk, or an integrated circuit (IC) card, which is inserted into the computer 200. Then, the computer 200 may read the hot spot calculation program 205a from these media to execute the hot spot calculation program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for calculating a dangerous spot and time for a computer to execute a process comprising:
   detecting a first avoidance action of a first mobile body and a second avoidance action of a second mobile body by determining whether a mobile body closest to the second mobile body at a time point at which the second avoidance action is detected is the first mobile body of which the first avoidance action is detected based on locus data when the first mobile body and the second mobile body belong to a certain area, the first avoidance action and the second avoidance action being an action for avoiding a possibility of a collision detected by an intersection of the first mobile body and a second mobile body;
   calculating an evaluation value that indicates a possibility of a third avoidance action by a third mobile body under an influence of the first avoidance action based on a speed and an orientation of the third mobile body when that the mobile body closest to the second mobile body at the time point is the first mobile body is determined, the evaluation value including information that indicates whether loci of the first mobile body and the second mobile body are in a crossing relationship; and calculating, based on the evaluation value, a collision risk in the certain area.

2. A device for calculating a dangerous spot and time, comprising:

one or more memories; and one or more processors coupled to the one or more memories and the one or more processors configured to:

detect a first avoidance action of a first mobile body and a second avoidance action of a second mobile body by determining whether a mobile body closest to the second mobile body at a time point at which the second avoidance action is detected is the first mobile body of which the first avoidance action is detected based on locus data when the first mobile body and the second mobile body belong to a certain area, the first avoidance action and the second avoidance action being an action for avoiding a possibility of a collision detected by an intersection of the first mobile body and a second mobile body;

calculate an evaluation value that indicates a possibility of a third avoidance action by a third mobile body under an influence of the first avoidance action based on a speed and an orientation of the third mobile body when that the mobile body closest to the second mobile body at the time point is the first mobile body is determined, the evaluation value including information that indicates whether loci of the first mobile body and the second mobile body are in a crossing relationship; and calculate, based on the evaluation value, a collision risk in the certain area.

3. The device according to claim 2, wherein the collision risk in the area is calculated by an existing method, and the one or more processors further configured to correct the collision risk in the area based on the evaluation value.

4. The method for calculating a dangerous spot and time according to claim 1, wherein the collision risk in the area is calculated by an existing method, and the calculating the collision risk includes correcting the collision risk in the area based on the evaluation value.

5. A non-transitory computer-readable storage medium storing a program for calculating a dangerous spot and time that causes at least one computer to execute a process, the process comprising:

detecting a first avoidance action of a first mobile body and a second avoidance action of a second mobile body by determining whether a mobile body closest to the second mobile body at a time point at which the second avoidance action is detected is the first mobile body of which the first avoidance action is detected based on locus data when the first mobile body and the second mobile body belong to a certain area, the first avoidance action and the second avoidance action being an action for avoiding a possibility of a collision detected by an intersection of the first mobile body and a second mobile body;

calculating an evaluation value that indicates a possibility of a third avoidance action by a third mobile body under an influence of the first avoidance action based on a speed and an orientation of the third mobile body when that the mobile body closest to the second mobile body at the time point is the first mobile body is determined, the evaluation value including information that indicates whether loci of the first mobile body and the second mobile body are in a crossing relationship; and calculating, based on the evaluation value, a collision risk in the certain area.

6. The non-transitory computer-readable storage medium according to claim 5, wherein the process further comprising the collision risk in the area is calculated by an existing method, and wherein the calculating the collision risk includes correcting the collision risk in the area based on the evaluation value.

* * * * *